United States Patent
Kuang et al.

(10) Patent No.: US 11,553,419 B2
(45) Date of Patent: Jan. 10, 2023

(54) TIMER PROCESSING METHOD AND TERMINAL DEVICE

(71) Applicant: HUAWEI TECHNOLOGIES CO., LTD., Guangdong (CN)

(72) Inventors: Yiru Kuang, Beijing (CN); Haibo Xu, Beijing (CN); Zhenzhen Cao, Beijing (CN); Bingzhao Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/959,411

(22) PCT Filed: Jan. 11, 2019

(86) PCT No.: PCT/CN2019/071294
§ 371 (c)(1),
(2) Date: Jun. 30, 2020

(87) PCT Pub. No.: WO2019/137457
PCT Pub. Date: Jul. 18, 2019

(65) Prior Publication Data
US 2020/0374799 A1    Nov. 26, 2020

(30) Foreign Application Priority Data
Jan. 11, 2018   (CN) .......................... 201810028302.8

(51) Int. Cl.
*H04W 52/02* (2009.01)
*H04W 72/04* (2009.01)
*H04W 74/02* (2009.01)

(52) U.S. Cl.
CPC ..... *H04W 52/0216* (2013.01); *H04W 72/044* (2013.01); *H04W 74/02* (2013.01)

(58) Field of Classification Search
CPC .............. H04L 5/0044; H04L 5/0098; H04W 52/0216; H04W 72/044; H04W 72/0453; H04W 74/02; H04W 74/0833
See application file for complete search history.

(56) References Cited

U.S. PATENT DOCUMENTS

10,813,137 B2 * 10/2020 Shih .................. H04W 74/0833
2013/0077514 A1    3/2013 Dinan
(Continued)

FOREIGN PATENT DOCUMENTS

CA    3022159 A1    4/2019
CN    101946424 A    1/2011
(Continued)

OTHER PUBLICATIONS

R1-1711595 Samsung,"Impact of channel estimation error on the performance of high spectral efficiency MIMO schemes",3GPP TSG RAN WG1 NR Ad-Hoc#2,Qingdao, P.R. China Jun. 27-30, 2017,total 4 pages.
(Continued)

*Primary Examiner* — Liton Miah

(57) ABSTRACT

A timer processing method includes: receiving, by a terminal device, a first message sent by a network device, and starting or restarting a timer based on a scrambling identifier of the first message, wherein the timer is a timer used by the terminal device to switch from an active downlink BWP to a default downlink BWP, or is a timer used by the terminal device to activate a default downlink BWP and deactivate an active downlink BWP; or if an active BWP pair of the terminal device is not a default BWP pair, starting or restarting, by the terminal device, a timer based on a scrambling identifier of the first message, wherein the timer is a timer used by the terminal device to switch from the
(Continued)

active BWP pair to the default BWP pair, or is a timer used by the terminal device to activate the default BWP pair.

15 Claims, 7 Drawing Sheets

(56) References Cited

U.S. PATENT DOCUMENTS

| | | | |
|---|---|---|---|
| 2014/0233538 A1 | 8/2014 | Zhang et al. | |
| 2019/0132855 A1* | 5/2019 | Lee | H04W 72/1268 |
| 2019/0215868 A1* | 7/2019 | Ye | H04L 69/28 |
| 2020/0296751 A1* | 9/2020 | Chen | H04W 72/1273 |
| 2020/0322116 A1* | 10/2020 | Zhou | H04B 7/088 |
| 2020/0328867 A1* | 10/2020 | Shi | H04W 76/11 |
| 2020/0396044 A1* | 12/2020 | Lee | H04L 47/74 |
| 2021/0153236 A1* | 5/2021 | Yi | H04W 72/042 |
| 2021/0167930 A1* | 6/2021 | Jeon | H04L 5/0094 |

FOREIGN PATENT DOCUMENTS

| | | |
|---|---|---|
| CN | 102300331 A | 12/2011 |
| CN | 106031257 A | 10/2016 |
| EP | 3478019 A1 | 5/2019 |
| EP | 3512286 A1 | 7/2019 |
| EP | 3570613 A1 | 11/2019 |
| EP | 3720167 A1 | 10/2020 |
| GB | 2568672 A | 5/2019 |
| JP | 2021510260 A | 4/2021 |
| RU | 2489810 C2 | 8/2013 |
| WO | 2019088531 A1 | 5/2019 |
| WO | 2019127405 A1 | 7/2019 |
| WO | 2019134664 A1 | 7/2019 |

OTHER PUBLICATIONS

3GPP TS 38.321 V15.0.0 (Dec. 2017);3rd Generation Partnership Project;Technical Specification Group Radio Access Network;NR;Medium Access Control (MAC) protocol specification(Release 15);total 55 pages.

R2-1800189 Huawei, HiSilicon,"Discussion on BWP inactivity timer",3GPP TSG-RAN2#AH-1801, Vancouver, Canada, Jan. 22-26, 2018 ;total 5 pages.

R2-1712212 ASUSTeK,"Details of BWP inactivity timer",3GPP TSG-RAN WG2 Meeting #100,Reno, USA, Nov. 27-Dec. 1, 2017,total 5 pages.

R1-1715425 Huawei, HiSilicon,"Overview of bandwidth part, CA, and DC operation including SRS switching",3GPP TSG RAN WG1 Meeting NR#3,Nagoya, Japan, Sep. 18-21, 2017,total 14 pages.

R2-1711595 Samsung,"The Impact of Bandwidth Part on RAN2: Overview and Issues",3GPP TSG RAN WG2 #99bis, Prague, Czech Republic, Oct. 9-13, 2017,total 8 pages.

R2-1710134 OPPO,"SPS operations for BWP switching",3GPP TSG RAN WG2 #99-Bis,Prague, Czech Republic, Oct. 9-13, 2017,total 3 pages.

3GPP TS 38.321 V2.0.0 (Dec. 2017),3rd Generation Partnership Project;Technical Specification Group Radio Access Network;NR;Medium Access Control (MAC) protocol specification(Release 15),total 55 pages.

3GPP TS 38.331 V15.0.0 (Dec. 2017),3rd Generation Partnership Project;Technical Specification Group Radio Access NetworkNR-Radio Resource Control (RRC) protocol specification(Release 15),total 188 pages.

R1-1720349 Samsung,"On Bandwidth Part Operation",3GPP TSG RAN WG1 Meeting #91,Reno, USA, Nov. 27-Dec. 1, 2017,total 5 pages.

R2-1713867 Samsung ,"Issues on Timer-based BWP switching",3GPP TSG-RAN WG2 NR #100 Meeting ,Reno, USA, Nov. 27-Dec. 1, 2017,total 3 pages.

3GPP TS 38.212 V15.0.0 (Dec. 2017),3rd Generation Partnership Project;Technical Specification Group Radio Access Network;NR;Multiplexing and channel coding(Release 15),total 82 pages.

3GPP TS 38.321 V1.2.0 (Dec. 2017), 3rd Generation Partnership Project;Technical Specification Group Radio Access Network;NR;Medium Access Control (MAC) protocol specification(Release 15), total 55 pages.

* cited by examiner

TIMER PROCESSING METHOD AND TERMINAL DEVICE

CROSS-REFERENCE TO RELATED APPLICATIONS

This application is a national stage of International Application No. PCT/CN2019/071294, filed on Jan. 11, 2019, which claims priority to Chinese Patent Application No. 201810028302.8, filed on Jan. 11, 2018. Both of the aforementioned applications are hereby incorporated by reference in their entireties.

TECHNICAL FIELD

This application relates to communications technologies, and in particular, to a timer processing method and a terminal device.

BACKGROUND

As communications technologies continuously develop, a 5th generation (5th-Generation, 5G) new radio (New Radio, NR) technology introduces a concept of bandwidth part (Bandwidth Part, BWP). In the first release of 5G NR, namely, in the 5G NR Rel-15, a base station can configure a maximum of 4 BWPs on one bandwidth carrier for one terminal device. One terminal device has only one active downlink BWP and one active uplink BWP in one serving cell at any moment. In a paired spectrum scenario, namely, with frequency division duplexing (Frequency Division Duplexing, FDD), the configured BWPs may include one default downlink BWP (default DL BWP), and if no default downlink BWP is configured, an initial DL BWP (initial DL BWP) is the default downlink BWP by default. In an unpaired spectrum scenario, namely, with Time Division Duplexing (Time Division Duplexing, TDD), an uplink BWP and a downlink BWP appear in pairs, and the paired uplink BWP and downlink BWP are referred to as an uplink/downlink BWP (DL/UL BWP) pair or a BWP pair. The configured BWPs may include one default BWP pair (default BWP pair), and if no default BWP pair is configured, an initial BWP pair (initial BWP pair) is the default BWP pair by default. The default BWP corresponds to relatively narrow downlink bandwidth. A terminal device working on the default downlink BWP needs to listen to downlink control information (Downlink Control Information, DCI) on a narrow band only. The downlink control information is carried on a physical downlink control channel (Physical Downlink Control Channel, PDCCH), that is, the downlink control information is sent on the PDCCH. In other words, blind detection is performed in relatively small search space. Therefore, power consumption of the terminal device can be reduced. It should be noted that, receiving a PDCCH by a terminal device may be understood as receiving information carried on the PDCCH, or understood as receiving information such as DCI sent on the PDCCH.

A concept of BWP timer is introduced to reduce power consumption of user equipment. A BWP inactivity timer is used as an example. The BWP inactivity timer is a timer that controls the terminal device to fall back to a default downlink BWP or a default BWP pair. In the paired spectrum scenario, when the terminal device works on an active downlink BWP, and the active downlink BWP is not the default downlink BWP, the terminal device needs to run the BWP inactivity timer. In the unpaired spectrum scenario, when the terminal device works on an active BWP pair, and the active BWP pair is not the default BWP pair, the terminal device needs to run the BWP inactivity timer. When the BWP inactivity timer expires, it indicates that the terminal device does not receive a downlink assignment in a specific period of time. In this case, the terminal device does not need to work on large bandwidth for data communication and only needs to work on narrow bandwidth. In other words, the terminal device may automatically switch to and work on the default downlink BWP or the default BWP pair, to reduce the power consumption of the terminal device.

In the prior art, whether to start a BWP inactivity timer is determined based on a PDCCH that is received by a terminal device and that indicates a downlink assignment (downlink assignment), or is determined based on a PDCCH that is received by a terminal device and that indicates switching to a non-default BWP. A default BWP may be understood as a default downlink BWP or a default BWP pair. To be specific, the BWP inactivity timer is started or restarted provided that the terminal device receives the PDCCH indicating a downlink assignment or indicating switching to a non-default BWP. It should be noted that, BWP switching may be understood as activating one inactive BWP and deactivating one active BWP. BWP switching may be downlink BWP switching or BWP pair switching. The BWP pair switching may be understood as switching both a downlink BWP and an uplink BWP. However, in the prior art, there is an error or an omission during timer start or restart. Consequently, the terminal device cannot correctly switch to a default downlink BWP, and power consumption of the terminal device cannot be reduced.

SUMMARY

This application provides a timer processing method and a terminal device, to resolve a prior-art problem that a terminal device cannot correctly switch to a default downlink BWP and power consumption of the terminal device cannot be reduced because there is an error or an omission during timer start or restart.

According to a first aspect, an embodiment of this application provides a timer processing method. The timer processing method may include:

receiving, by a terminal device, a first message sent by a network device, wherein the first message is used to indicate a downlink assignment or an uplink grant, or the first message is used to indicate bandwidth part BWP switching; and if an active downlink BWP of the terminal device is not a default downlink BWP, starting or restarting, by the terminal device, a timer based on a scrambling identifier of the first message, wherein the timer is a timer used by the terminal device to switch from the active downlink BWP to the default downlink BWP, or the timer is a timer used by the terminal device to activate the default downlink BWP and deactivate the active downlink BWP; or if an active BWP pair of the terminal device is not a default BWP pair, starting or restarting, by the terminal device, a timer based on a scrambling identifier of the first message, wherein the timer is a timer used by the terminal device to switch from the active BWP pair to the default BWP pair, or the timer is a timer used by the terminal device to activate the default BWP pair and deactivate the active BWP pair.

It can be learned that, different from the prior art in which a timer is directly started or restarted after a PDCCH is directly received, in this embodiment of this application, in determining of whether to start or restart a timer, whether to start or restart a timer further needs to be determined based on the scrambling identifier of the first message after the first message is received. This resolves a problem that the terminal device cannot correctly switch to the default downlink BWP and power consumption of the terminal device cannot be reduced, thereby reducing the power consumption of the terminal device.

In a possible implementation, the starting or restarting, by the terminal device, a timer based on a scrambling identifier of the first message includes:

starting or restarting, by the terminal device, the timer when the scrambling identifier is not a random access radio network temporary identifier RA-RNTI or a temporary cell radio network temporary identifier TC-RNTI.

In a possible implementation, the starting or restarting, by the terminal device, a timer based on a scrambling identifier of the first message includes:

starting or restarting, by the terminal device, the timer when the scrambling identifier is a first scrambling identifier, wherein the first scrambling identifier is any one or a combination of a cell radio network temporary identifier C-RNTI, a configured scheduling radio network temporary identifier CS-RNTI, a paging radio network temporary identifier P-RNTI, and a system information radio network temporary identifier SI-RNTI.

In a possible implementation, the starting or restarting, by the terminal device, a timer based on a scrambling identifier of the first message includes:

starting or restarting, by the terminal device, the timer when the scrambling identifier is a random access radio network temporary identifier RA-RNTI and the terminal device executes non-contention-based random access.

In a possible implementation, the timer processing method may further include:

when the scrambling identifier is an RA-RNTI and the terminal device executes contention-based random access, controlling, by the terminal device, the timer to maintain an original state.

In a possible implementation, the timer is a timer associated with the active downlink BWP of the terminal device, or the timer is a timer associated with the active BWP pair of the terminal device.

According to a second aspect, an embodiment of this application further provides a timer processing method. The timer processing method may include:

receiving, by a terminal device, a first message sent by a network device, wherein the first message is used to indicate a downlink assignment or an uplink grant, or the first message is used to indicate bandwidth part BWP switching; and starting or restarting, by the terminal device, a timer based on a carrier index of the first message, wherein the timer is a timer used by the terminal device to switch from an active downlink BWP to a default downlink BWP, or the timer is a timer used by the terminal device to activate a default downlink BWP and deactivate an active downlink BWP, or the timer is a timer used by the terminal device to switch from an active BWP pair to a default BWP pair, or the timer is a timer used by the terminal device to activate a default BWP pair and deactivate an active BWP pair.

It can be learned that, different from the prior art in which a timer is directly started or restarted after a PDCCH is directly received, in this embodiment of this application, in determining of whether to start or restart a timer, whether to start or restart a timer further needs to be determined based on a carrier identifier of the first message after the first message is received. This resolves a problem that the terminal device cannot correctly switch to the default downlink BWP and power consumption of the terminal device cannot be reduced, thereby reducing the power consumption of the terminal device.

In a possible implementation, if the active downlink BWP of the terminal device is not the default downlink BWP and the active downlink BWP of the terminal device is a downlink BWP of a carrier or a serving cell indicated by the carrier index, or if the active BWP pair of the terminal device is not the default BWP pair and the active BWP pair of the terminal device is a BWP pair of a carrier or a serving cell indicated by the carrier index, the timer is a timer of the carrier or the serving cell.

In a possible implementation, if the active downlink BWP of the terminal device is not the default downlink BWP and the active downlink BWP of the terminal device is a downlink BWP of a carrier or a serving cell used for receiving the first message, or if the active BWP pair of the terminal device is not the default BWP pair and the active BWP pair of the terminal device is a BWP pair of a carrier or a serving cell used for receiving the first message, the timer is a timer of the carrier or the serving cell used for receiving the first message.

In a possible implementation, the timer is a timer associated with the active downlink BWP of the terminal device, or the timer is a timer associated with an active downlink BWP of the terminal device on the carrier or in the serving cell, or the timer is a timer associated with the active BWP pair of the terminal device, or the timer is a timer associated with an active BWP pair of the terminal device on the carrier or in the serving cell.

According to a third aspect, an embodiment of this application further provides a timer processing method. The timer processing method may include:

determining, by a terminal device, that at least one configured resource exists; and if an active bandwidth part BWP pair of the terminal device is not a default BWP pair, starting or restarting, by the terminal device, a timer based on the at least one configured resource that exists, wherein the timer is a timer used by the terminal device to switch from the active BWP pair to the default BWP pair, or the timer is a timer used by the terminal device to activate the default BWP pair and deactivate the active BWP pair.

It can be learned that, in this embodiment of this application, with semi-dynamic scheduling, when at least one configured resource exists, whether to start or restart a timer may be determined based on the at least one configured resource that exists. This resolves a problem that the terminal device cannot correctly switch to the default downlink BWP and power consumption of the terminal device cannot be reduced, thereby reducing the power consumption of the terminal device.

In a possible implementation, data is transmitted on the configured resource.

In a possible implementation, the starting or restarting, by the terminal device, a timer based on the at least one configured resource that exists includes:

the configured resource is a downlink resource or an uplink resource; and starting or restarting, by the terminal device, the timer when determining that the at least one configured resource exists; or starting or restarting, by the terminal device, the timer when the configured resource is a downlink resource and downlink data is transmitted on the downlink resource; or starting or restarting, by the terminal device, the timer when the configured resource is an uplink resource and uplink data is transmitted on the uplink resource.

In a possible implementation, the timer is a timer associated with the active BWP pair of the terminal device.

In addition, it should be noted that, when a timer is associated with a BWP, the timer processing method may further be a method illustrated in any one of the following fourth to sixth aspects.

According to the fourth aspect, an embodiment of this application provides a timer processing method. The method may include:

receiving, by a terminal device, an instruction message sent by a network device, wherein the instruction message instructs the terminal device to activate at least one secondary serving cell; and starting or restarting, by the terminal device, a timer associated with the secondary serving cell, wherein the timer is a timer used by the terminal device to switch from an active downlink bandwidth part BWP to a default downlink BWP, or the timer is a timer used by the terminal device to activate a default downlink BWP and deactivate an active downlink BWP, or the timer is a timer used by the terminal device to switch from an active BWP pair to a default BWP pair, or the timer is a timer used by the terminal device to activate a default BWP pair and deactivate an active BWP pair.

In a possible implementation, the secondary serving cell is in an inactive state.

In a possible implementation, before the receiving, by a terminal device, an instruction message sent by a network device, the method may further include:

receiving, by the terminal device, a radio resource control RRC message sent by the network device, wherein the RRC message includes instruction information, wherein the instruction information instructs to add or modify the at least one secondary serving cell, the RRC message further includes a first downlink BWP of the secondary serving cell, the first downlink BWP is a downlink BWP that is first activated when the secondary serving cell is activated, and the first downlink BWP is not a default downlink BWP; or the RRC message further includes a first BWP pair of the secondary serving cell, the first BWP pair is a BWP pair that is first activated when the secondary serving cell is activated, and the first BWP pair is not a default downlink BWP pair.

In a possible implementation, the timer is a timer associated with the first downlink BWP, or the timer associated with the secondary serving cell is a timer associated with a first downlink BWP of the terminal device in the secondary serving cell, or the timer is a timer associated with the first BWP pair, or the timer associated with the secondary serving cell is a timer associated with a first BWP pair of the terminal device in the secondary serving cell; and the starting or restarting, by the terminal device, a timer associated with the secondary serving cell includes:

starting or restarting, by the terminal device, the timer associated with the first downlink BWP of the secondary serving cell, or starting or restarting, by the terminal device, the timer associated with the first BWP pair of the secondary serving cell.

According to the fifth aspect, an embodiment of this application provides a timer processing method. The method may include:

receiving, by a terminal device, an instruction message sent by a network device, wherein the instruction message instructs the terminal device to deactivate at least one secondary serving cell, and a timer associated with the secondary serving cell is in a running state, wherein the timer is a timer used by the terminal device to switch from an active downlink bandwidth part BWP to a default downlink BWP, or the timer is a timer used by the terminal device to activate a default downlink BWP and deactivate an active downlink BWP, or the timer is a timer used by the terminal device to switch from an active BWP pair to a default BWP pair, or the timer is a timer used by the terminal device to activate a default BWP pair and deactivate an active BWP pair; and stopping or resetting, by the terminal device, the timer associated with the secondary serving cell, or stopping and resetting, by the terminal device, the timer associated with the secondary serving cell.

In a possible implementation, the timer is a timer associated with the active downlink BWP of the terminal device, or the timer associated with the secondary serving cell is a timer associated with an active downlink BWP of the terminal device in the secondary serving cell, or the timer is a timer associated with the active BWP pair of the terminal device, or the timer associated with the secondary serving cell is a timer associated with an active BWP pair of the terminal device in the secondary serving cell.

According to the sixth aspect, an embodiment of this application provides a timer processing method. The method may include:

determining, by a terminal device, that a secondary serving cell deactivation timer of a secondary serving cell expires, wherein a timer associated with the secondary serving cell is in a running state, wherein the timer is a timer used by the terminal device to switch from an active downlink bandwidth part BWP to a default downlink BWP, or the timer is a timer used by the terminal device to activate a default downlink BWP and deactivate an active downlink BWP, or the timer is a timer used by the terminal device to switch from an active BWP pair to a default BWP pair, or the timer is a timer used by the terminal device to activate a default BWP pair and deactivate an active BWP pair; and stopping or resetting, by the terminal device, the timer associated with the secondary serving cell, or stopping and resetting, by the terminal device, the timer associated with the secondary serving cell.

In a possible implementation, the timer is a timer associated with the active downlink BWP of the terminal device, or the timer associated with the secondary serving cell is a timer associated with an active downlink BWP of the terminal device in the secondary serving cell, or the timer is a timer associated with the active BWP pair of the terminal device, or the timer associated with the secondary serving cell is a timer associated with an active BWP pair of the terminal device in the secondary serving cell.

It should be noted that, in the timer processing method illustrated in any one of the fifth and the sixth aspects, the timer associated with the secondary serving cell may be a timer associated with any one or all of active BWPs of the secondary serving cell.

According to a seventh aspect, an embodiment of this application further provides a terminal device. The terminal device may include:

a receiving unit, configured to receive a first message sent by a network device, wherein the first message is used to indicate a downlink assignment or an uplink grant, or the first message is used to indicate bandwidth part BWP switching; and a processing unit, configured to: if an active downlink BWP of the terminal device is not a default downlink BWP, start or restart a timer based on a scrambling identifier of the first message, wherein the timer is a timer used by the terminal device to switch from the active downlink BWP to the default downlink BWP, or the timer is a timer used by the terminal device to activate the default downlink BWP and deactivate the active downlink BWP; wherein the processing unit is further configured to: if an active BWP pair of the terminal device is not a default BWP pair, start or restart a timer based on the scrambling identifier of the first message, wherein the timer is a timer used by the terminal device to switch from the active BWP pair to the default BWP pair, or the timer is a timer used by the terminal device to activate the default BWP pair and deactivate the active BWP pair.

In a possible implementation, the processing unit is specifically configured to start or restart the timer when the scrambling identifier is not a random access radio network temporary identifier RA-RNTI or a temporary cell radio network temporary identifier TC-RNTI.

In a possible implementation, the processing unit is specifically configured to start or restart the timer when the scrambling identifier is a first scrambling identifier, wherein the first scrambling identifier is any one or a combination of a cell radio network temporary identifier C-RNTI, a configured scheduling radio network temporary identifier CS-RNTI, a paging radio network temporary identifier P-RNTI, and a system information radio network temporary identifier SI-RNTI.

In a possible implementation, the processing unit is specifically configured to start or restart the timer when the scrambling identifier is a random access radio network temporary identifier RA-RNTI and the terminal device executes non-contention-based random access.

In a possible implementation, the terminal device may further include:

a maintaining unit, configured to, when the scrambling identifier is an RA-RNTI and the terminal device executes contention-based random access, control the timer to maintain an original state.

In a possible implementation, the timer is a timer associated with the active downlink BWP of the terminal device, or the timer is a timer associated with the active BWP pair of the terminal device.

According to an eighth aspect, an embodiment of this application further provides a terminal device. The terminal device may include:

a receiving unit, configured to receive a first message sent by a network device, wherein the first message is used to indicate a downlink assignment or an uplink grant, or the first message is used to indicate bandwidth part BWP switching; and a processing unit, configured to start or restart a timer based on a carrier index of the first message, wherein the timer is a timer used by the terminal device to switch from an active downlink BWP to a default downlink BWP, or the timer is a timer used by the terminal device to activate a default downlink BWP and deactivate an active downlink BWP, or the timer is a timer used by the terminal device to switch from an active BWP pair to a default BWP pair, or the timer is a timer used by the terminal device to activate a default BWP pair and deactivate an active BWP pair.

In a possible implementation, if the active downlink BWP of the terminal device is not the default downlink BWP and the active downlink BWP of the terminal device is a downlink BWP of a carrier or a serving cell indicated by the carrier index, or if the active BWP pair of the terminal device is not the default BWP pair and the active BWP pair of the terminal device is a BWP pair of a carrier or a serving cell indicated by the carrier index, the timer is a timer of the carrier or the serving cell.

In a possible implementation, if the active downlink BWP of the terminal device is not the default downlink BWP and the active downlink BWP of the terminal device is a downlink BWP of a carrier or a serving cell used for receiving the first message, or if the active BWP pair of the terminal device is not the default BWP pair and the active BWP pair of the terminal device is a BWP pair of a carrier or a serving cell used for receiving the first message, the timer is a timer of the carrier or the serving cell used for receiving the first message.

In a possible implementation, the timer is a timer associated with the active downlink BWP of the terminal device, or the timer is a timer associated with an active downlink BWP of the terminal device on the carrier or in the serving cell, or the timer is a timer associated with the active BWP pair of the terminal device, or the timer is a timer associated with an active BWP pair of the terminal device on the carrier or in the serving cell.

According to a ninth aspect, an embodiment of this application further provides a terminal device. The terminal device may include:

a determining unit, configured to determine that at least one configured resource exists; and a processing unit, configured to: if an active bandwidth part BWP pair of the terminal device is not a default BWP pair, start or restart a timer based on the at least one configured resource that exists, wherein the timer is a timer used by the terminal device to switch from the active BWP pair to the default BWP pair, or the timer is a timer used by the terminal device to activate the default BWP pair and deactivate the active BWP pair.

In a possible implementation, data is transmitted on the configured resource.

In a possible implementation, the configured resource is a downlink resource or an uplink resource; and the processing unit is specifically configured to: start or restart the timer when the at least one configured resource exists; or start or restart the timer when the configured resource is a downlink resource and downlink data is transmitted on the downlink resource; or start or restart the timer when the configured resource is an uplink resource and uplink data is transmitted on the uplink resource.

In a possible implementation, the timer is a timer associated with the active BWP pair of the terminal device.

According to a tenth aspect, an embodiment of this application further provides a terminal device. The terminal device may include a processor and a memory, wherein the memory is configured to store a program instruction; and the processor is configured to invoke and execute the program instruction stored in the memory, to execute the timer processing method according to any one of the first aspect to the third aspect.

According to a eleventh aspect, an embodiment of this application further provides a terminal device. The terminal device may include a receiver and a processor, wherein the receiver is configured to receive a first message sent by a network device, wherein the first message is used to indicate a downlink assignment or an uplink grant, or the first message is used to indicate bandwidth part BWP switching; and the processor is configured to: if an active downlink BWP of the terminal device is not a default downlink BWP, start or restart a timer based on a scrambling identifier of the first message, wherein the timer is a timer used by the terminal device to switch from the active downlink BWP to the default downlink BWP, or the timer is a timer used by the terminal device to activate the default downlink BWP and deactivate the active downlink BWP; or the processor is configured to: if an active BWP pair of the terminal device is not a default BWP pair, start or restart a timer based on a scrambling identifier of the first message, wherein the timer is a timer used by the terminal device to switch from the active BWP pair to the default BWP pair, or the timer is a timer used by the terminal device to activate the default BWP pair and deactivate the active BWP pair.

In a possible implementation, the processor is specifically configured to start or restart the timer when the scrambling identifier is not a random access radio network temporary identifier RA-RNTI or a temporary cell radio network temporary identifier TC-RNTI.

In a possible implementation, the processor is specifically configured to start or restart the timer when the scrambling identifier is a first scrambling identifier, wherein the first scrambling identifier is any one or a combination of a cell radio network temporary identifier C-RNTI, a configured scheduling radio network temporary identifier CS-RNTI, a paging radio network temporary identifier P-RNTI, and a system information radio network temporary identifier SI-RNTI.

In a possible implementation, the processor is specifically configured to start or restart the timer when the scrambling identifier is a random access radio network temporary identifier RA-RNTI and the terminal device executes non-contention-based random access.

In a possible implementation, the processor is further configured to, when the scrambling identifier is an RA-RNTI and the terminal device executes contention-based random access, control the timer to maintain an original state.

In a possible implementation, the timer is a timer associated with the active downlink BWP of the terminal device, or the timer is a timer associated with the active BWP pair of the terminal device.

According to an twelfth aspect, an embodiment of this application further provides a terminal device. The terminal device may include a receiver and a processor, wherein the receiver is configured to receive a first message sent by a network device, wherein the first message is used to indicate a downlink assignment or an uplink grant, or the first message is used to indicate bandwidth part BWP switching; and the processor is configured to start or restart a timer based on a carrier index of the first message, wherein the timer is a timer used by the terminal device to switch from an active downlink BWP to a default downlink BWP, or the timer is a timer used by the terminal device to activate a default downlink BWP and deactivate an active downlink BWP, or the timer is a timer used by the terminal device to switch from an active BWP pair to a default BWP pair, or the timer is a timer used by the terminal device to activate a default BWP pair and deactivate an active BWP pair.

In a possible implementation, if the active downlink BWP of the terminal device is not the default downlink BWP and the active downlink BWP of the terminal device is a downlink BWP of a carrier or a serving cell indicated by the carrier index, or if the active BWP pair of the terminal device is not the default BWP pair and the active BWP pair of the terminal device is a BWP pair of a carrier or a serving cell indicated by the carrier index, the timer is a timer of the carrier or the serving cell.

In a possible implementation, if the active downlink BWP of the terminal device is not the default downlink BWP and the active downlink BWP of the terminal device is a downlink BWP of a carrier or a serving cell used for receiving the first message, or if the active BWP pair of the terminal device is not the default BWP pair and the active BWP pair of the terminal device is a BWP pair of a carrier or a serving cell used for receiving the first message, the timer is a timer of the carrier or the serving cell used for receiving the first message.

In a possible implementation, the timer is a timer associated with the active downlink BWP of the terminal device, or the timer is a timer associated with an active downlink BWP of the terminal device on the carrier or in the serving cell, or the timer is a timer associated with the active BWP pair of the terminal device, or the timer is a timer associated with an active BWP pair of the terminal device on the carrier or in the serving cell.

According to a thirteenth aspect, an embodiment of this application further provides a terminal device. The terminal device may include a processor, wherein the processor is configured to determine that at least one configured resource exists; and the processor is configured to: if an active bandwidth part BWP pair of the terminal device is not a default BWP pair, start or restart a timer based on the at least one configured resource that exists, wherein the timer is a timer used by the terminal device to switch from the active BWP pair to the default BWP pair, or the timer is a timer used by the terminal device to activate the default BWP pair and deactivate the active BWP pair.

In a possible implementation, data is transmitted on the configured resource.

In a possible implementation, the configured resource is a downlink resource or an uplink resource; and the processor is specifically configured to: start or restart the timer when determining that the at least one configured resource exists; or start or restart the timer when the configured resource is a downlink resource and downlink data is transmitted on the downlink resource; or start or restart the timer when the configured resource is an uplink resource and uplink data is transmitted on the uplink resource.

In a possible implementation, the timer is a timer associated with the active BWP pair of the terminal device.

According to a fourteenth aspect, an embodiment of this application further provides a terminal device. The terminal device may include a processor and a memory, wherein the memory is configured to store a program instruction; and the processor is configured to invoke and execute the program instruction stored in the memory, to execute the timer processing method according to any one of the first aspect to the third aspect.

According to a fifteenth aspect, an embodiment of this application further provides a computer-readable storage medium, wherein the computer-readable storage medium stores a computer program, and when executed by a processor, the computer program executes the timer processing method according to any one of the first aspect to the third aspect.

According to a sixteenth aspect, an embodiment of this application further provides a chip, wherein the chip stores a computer program, and when executed by a processor, the computer program executes the timer processing method according to any one of the first aspect to the third aspect.

According to the timer processing method and the terminal device provided in the embodiments of this application, in determining of whether to start or restart a timer, the terminal device receives the first message sent by the network device. If the active downlink bandwidth part BWP of the terminal device is not the default downlink BWP, the terminal device starts or restarts a timer based on the scrambling identifier of the first message, wherein the timer is a timer used by the terminal device to switch from the active downlink BWP to the default downlink BWP, or the timer is a timer used by the terminal device to activate the default downlink BWP and deactivate the active downlink BWP. If the active BWP pair of the terminal device is not the default BWP pair, the terminal device starts or restarts a timer based on the scrambling identifier of the first message, wherein the timer is a timer used by the terminal device to switch from the active BWP pair to the default BWP pair, or the timer is a timer used by the terminal device to activate the default BWP pair and deactivate the active BWP pair. This resolves a problem that the terminal device cannot correctly switch to the default downlink BWP and power consumption of the terminal device cannot be reduced, thereby reducing the power consumption of the terminal device.

DESCRIPTION OF EMBODIMENTS

The embodiments of this application are applied to a 5G communications system or another system that may emerge in the future. The following describes some terms used in this application, to facilitate understanding of a person skilled in the art. It should be noted that, when solutions in the embodiments of this application are applied to the 5G communications system or the another system that may emerge in the future, names of a network device and a terminal may change, but this does not affect implementation of the solutions in the embodiments of this application.

Figure 1:
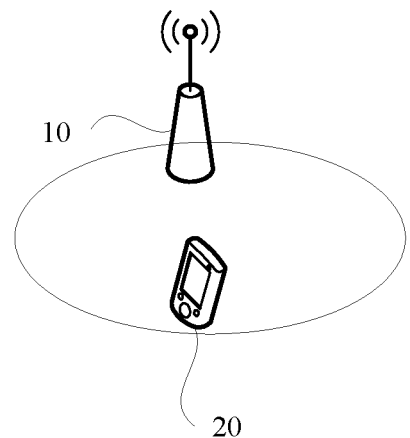
FIG. 1 is a schematic diagram of an application scenario according to an embodiment of this application.

FIG. 1 is a schematic diagram of an application scenario according to an embodiment of this application. A networking architecture shown in FIG. 1 mainly includes a network device 10 and a terminal device 20. The terminal device may communicate with the network device. In this application, the network device may configure both at least one downlink BWP and at least one uplink BWP for one terminal device. In a paired spectrum scenario, the at least one downlink BWP includes one default downlink BWP. In an unpaired spectrum scenario, the at least one downlink BWP includes one default downlink BWP, the at least one uplink BWP includes one default uplink BWP, and the default downlink BWP and the default uplink BWP are paired to form one default BWP pair. The default downlink BWP corresponds to relatively narrow downlink bandwidth. Therefore, when the terminal device transmits data on the default downlink BWP, the terminal device only needs to listen to downlink control information on a narrow band and perform blind detection in relatively small search space, thereby reducing power consumption of the terminal device.

(1) A terminal device is also referred to as a terminal or user equipment, and is a device that provides voice and/or data connectivity for a user, for example, a handheld device with a wireless connection function or an in-vehicle device. For example, common terminal devices include a mobile phone, a tablet computer, a notebook computer, a palmtop computer, a mobile internet device (mobile internet device, MID), and a wearable device. For example, wearable devices include a smartwatch, a smart band, and a pedometer.

(2) A network device is also referred to as a radio access network (Radio Access Network, RAN) device, and is a device that connects a terminal device to a wireless network. The network device includes network devices of various communications standards, for example, including but not limited to a base station, an evolved NodeB (evolved Node B, eNB), a radio network controller (radio network controller, RNC), a NodeB (Node B, NB), a base station controller (Base Station Controller, BSC), a base transceiver station (Base Transceiver Station, BTS), a home network device (for example, a home evolved NodeB, or a home Node B, HNB), and a base band unit (Base Band Unit, BBU).

(3) Bandwidth part (band width part, BWP): When bandwidth of a cell is large, a terminal device may work only on a part of the bandwidth of the cell. Each part of the bandwidth of the cell is referred to as a BWP.

(4) A network device includes network devices of various frequency standards, for example, including but not limited to a low-frequency network device and a high-frequency network device.

(5) "A plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

In the prior art, whether a BWP inactivity timer is started is determined based on a PDCCH received by a terminal. To be specific, the BWP inactivity timer is started or restarted provided that the PDCCH received by the terminal indicates a downlink assignment or indicates switching to a non-default BWP. However, in the prior art, there is an error or an omission during timer start or restart, and consequently the terminal cannot correctly switch to a default downlink BWP and power consumption of the terminal cannot be reduced. To resolve the problem in the prior art, an embodiment of this application provides a timer processing method, in which a terminal device does not directly start or restart a timer after receiving a first message sent by a network device, but needs to determine a scrambling identifier of the first message or a carrier index of the first message, to further determine whether to start or restart the timer. In addition, this embodiment of this application further provides a method for starting or restarting, in a non-dynamic scheduling scenario, a timer based on at least one configured resource that exists. This resolves the prior-art problem that a terminal device cannot correctly switch to a default downlink BWP and power consumption of the terminal cannot be reduced.

It should be noted that, when a timer is started or restarted in the foregoing three manners, the timer may be a timer associated with a serving cell or a timer associated with a BWP. In the first release of 5G NR, on a first bandwidth carrier, one terminal device has only one active downlink BWP or uplink BWP in a serving cell at any moment. Therefore, there is only one effective running timer. In this case, the timer controls the only one BWP regardless of whether the timer is associated with the serving cell or the BWP. In a future 5G release, on a first bandwidth carrier, one terminal device has at least one active downlink BWP or at least one uplink BWP in a serving cell at any moment. In this case, if a timer is associated with the serving cell, the timer needs to control a plurality of BWPs. In contrast, if the timer is associated with a BWP, there are a plurality of timers and each timer controls one corresponding BWP. The following separately describes different association scenarios by using specific embodiments, to be specific, describes how to start or restart a timer when the timer is associated with a serving cell or the timer is associated with a BWP. It should be noted that, if the term BWP appears, BWP may be understood as a downlink BWP in the paired spectrum scenario and may be understood as a BWP pair in the unpaired spectrum.

In a first association scenario, when a timer is associated with a serving cell, the timer may be started or restarted in a plurality of possible implementations. The following describes in detail how to start or restart the timer in the plurality of possible implementations.

Figure 2:
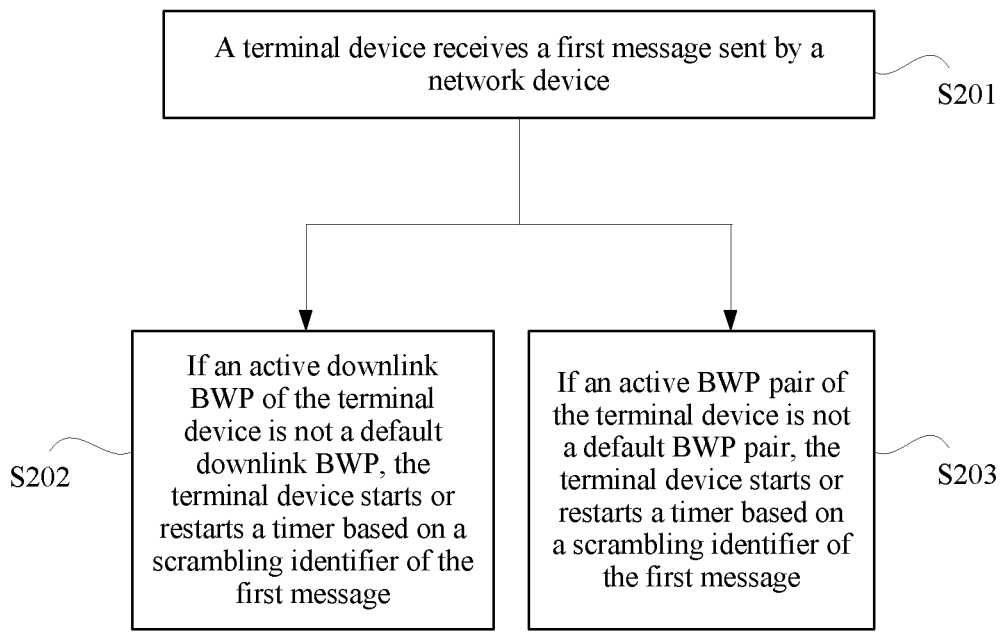
FIG. 2 is a schematic diagram of a timer processing method according to an embodiment of this application.

In one possible implementation, the terminal device may determine, based on the scrambling identifier of the first message, whether to start or restart the timer. FIG. 2 is a schematic diagram of a timer processing method according to an embodiment of this application. The timer processing method may include the following steps.

S201: A terminal device receives a first message sent by a network device.

The first message indicates a downlink assignment or an uplink grant, or the first message indicates bandwidth part BWP switching.

It should be noted that, the first message may be a message such as downlink control information carried on a PDCCH. For example, receiving the first message may be understood as receiving the PDCCH, or receiving the downlink control information, or receiving the downlink control information carried on the PDCCH, or receiving the downlink control information sent by using the PDCCH. In a paired spectrum scenario, the first message may indicate a downlink assignment. When the first message indicates a downlink assignment, whether to start or restart a timer further needs to be determined. Alternatively, the first message may indicate an uplink grant. When the first message indicates an uplink grant, a timer is not started or restarted. Certainly, the first message may also indicate BWP switching, and a downlink BWP that is switched to be not a default downlink BWP. In an unpaired spectrum scenario, because an uplink BWP and a downlink BWP appear in pairs, that is, a pair of uplink and downlink BWPs are both switched during BWP switching, a default BWP may be considered as including a pair of uplink and downlink BWPs. In this case, the first message indicates a downlink assignment or an uplink grant (uplink grant), or the first message indicates BWP switching and a BWP pair that is switched to is not a default BWP pair.

The paired spectrum scenario and the unpaired spectrum scenario are different, and therefore methods for starting or restarting a timer based on a scrambling identifier of the first message are also different and respectively correspond to S202 and S203.

S202: If an active downlink BWP of the terminal device is not a default downlink BWP, the terminal device starts or restarts a timer based on a scrambling identifier of the first message.

The timer is a timer used by the terminal device to switch from the active downlink BWP to the default downlink BWP, or the timer is a timer used by the terminal device to activate the default downlink BWP and deactivate the active downlink BWP. In the paired spectrum scenario, if the first message indicates a downlink assignment and does not indicate BWP switching, it may be considered that the active downlink BWP of the terminal device is a downlink BWP used for receiving the first message; or if the first message indicates bandwidth part BWP switching, it may be considered that the active downlink BWP of the terminal device is a downlink BWP that is switched to. Alternatively, it may be considered that the active downlink BWP of the terminal device is a BWP indicated by the first message, for example, an active downlink BWP indicated in the downlink control information.

It should be noted that, the scrambling identifier of the first message herein is a radio network temporary identifier used to scramble a cyclic redundancy check (Cyclic Redundancy Check, CRC) code of the first message. For example, when the first message is downlink control information, the scrambling identifier is a radio network temporary identifier used to scramble a cyclic redundancy check code of the downlink control information. Scrambling the first message may be understood as scrambling the cyclic redundancy check code of the first message.

In the solution shown in S202, in the paired spectrum scenario, after the terminal device receives the first message indicating a downlink assignment, or after the terminal device receives the first message indicating BWP switching and the downlink BWP that is switched to is not the default downlink BWP, if the active downlink BWP of the terminal device is not the default downlink BWP in this case, the terminal device may start or restart the timer based on the scrambling identifier of the first message, wherein the timer is a timer used by the terminal device to switch from the active downlink BWP to the default downlink BWP, or the timer is a timer used by the terminal device to activate the default downlink BWP and deactivate the active downlink BWP. This avoids prior-art practice that a timer is directly started or restarted after a PDCCH is directly received, and resolves a problem that the terminal device cannot correctly switch to the default downlink BWP and power consumption of the terminal device cannot be reduced, thereby reducing the power consumption of the terminal device.

S203: If an active BWP pair of the terminal device is not a default BWP pair, the terminal device starts or restarts a timer based on a scrambling identifier of the first message.

The timer is a timer used by the terminal device to switch from the active BWP pair to the default BWP pair, or the timer is a timer used by the terminal device to activate the default BWP pair and deactivate the active BWP pair.

In the unpaired spectrum scenario, if the first message indicates a downlink assignment or an uplink grant and does not indicate BWP switching, it may be considered that the active BWP pair of the terminal device is a BWP pair that is corresponding to a downlink BWP used for receiving the first message or a BWP pair to which a downlink BWP used for receiving the first message belongs; or if the first message indicates bandwidth part BWP switching, it may be considered that the active BWP pair of the terminal device is a BWP pair that is switched to. Alternatively, it may be considered that the active BWP pair of the terminal device is a BWP pair indicated by the first message, for example, an active BWP pair indicated in the downlink control information. Alternatively, it may be considered that the active BWP pair of the terminal device is a BWP pair that is corresponding to a downlink BWP indicated by the first message or a BWP pair to which a downlink BWP indicated by the first message belongs, for example, an active BWP pair that is corresponding to a downlink BWP indicated in the downlink control information or an active BWP pair to which a downlink BWP indicated in the downlink control information belongs.

In the solution shown in S203, in the unpaired spectrum scenario, after the terminal device receives the first message indicating an uplink grant or a downlink assignment, or after the terminal device receives the first message indicating BWP switching and the BWP pair that is switched to is not the default BWP pair, if the active BWP pair of the terminal device is not the default BWP pair in this case, the terminal device may start or restart the timer based on the scrambling identifier of the first message, wherein the timer is a timer used by the terminal device to switch from the active BWP pair to the default BWP pair, or the timer is a timer used by the terminal device to activate the default BWP pair and deactivate the active BWP pair. This avoids prior-art practice that a timer is directly started or restarted after a PDCCH is directly received, and resolves a problem that the terminal device cannot correctly switch to the default BWP pair and power consumption of the terminal device cannot be reduced, thereby reducing the power consumption of the terminal device.

It should be noted that, in one scheduling process, only either S202 or S203 is executed after S201 is executed, in other words, S202 and S203 are not synchronously executed.

In S202 or S203 above, a different active BWP of the terminal device leads to a different manner of starting or restarting the timer based on the scrambling identifier of the first message. However, control conditions for starting or restarting the timer in these two manners are the same, to be specific, control conditions for the terminal device to start or restart the timer based on the scrambling identifier of the first message in S202 and S203 are the same. The terminal device may start or restart the timer based on the scrambling identifier of the first message in the following possible manners:

Manner 1: The terminal device starts or restarts the timer when the scrambling identifier is not a random access radio network temporary identifier RA-RNTI or a temporary cell radio network temporary identifier TC-RNTI.

It should be noted that, for the RA-RNTI, the timer needs to be stopped in a random access triggering process. In other words, that the timer is in a running state which is not expected in a random access process, to avoid a case in which the timer expires in the random access process. The first message scrambled by using the RA-RNTI schedules a random access response (Random Access Response, RAR), that is, a message 2 in the random access process. In a contention-based random access process, receiving an RAR does not mean that contention is successfully addressed, that is, the random access process may fail. If a timer is started immediately after the first message scrambled by using the RA-RNTI is received, the timer may expire in the random access process, or the timer may be incorrectly in the running state when random access fails.

It should be noted that, for the TC-RNTI, only a contention-based random access process in which the terminal device is in an idle (idle) state occurs. In this case, the idle-state terminal device works on an initial BWP. A PDCCH scrambled by using a TC-RNTI schedules a message in a random access process. In this case, user equipment in the idle state has not received a configuration message of a base station, in other words, there is no concept of a default BWP. Therefore, the TC-RNTI is unrelated to timer start or restart.

In the manner 1, after receiving the first message, the terminal device determines whether the scrambling identifier that is used to scramble the first message is the RA-RNTI or TC-RNTI. If the scrambling identifier is not the RA-RNTI or TC-RNTI, it indicates that the terminal device may start or restart the timer. In this case, the terminal device starts or restarts the timer based on the scrambling identifier. This avoids a case in which the timer expires in the random access process or a case in which the timer is incorrectly in the running state when random access fails, and resolves a problem that the terminal device cannot correctly switch to the default downlink BWP and power consumption of the terminal device cannot be reduced, thereby reducing the power consumption of the terminal device.

The manner 1 describes a case in which the timer is directly started or restarted when the scrambling identifier of the first message is not the RA-RNTI. Conversely, if the scrambling identifier of the first message is the RA-RNTI, a manner of executing random access by the terminal device further needs to be determined, to determine whether to start or restart the timer, as described in a manner 2 below:

Manner 2: When the scrambling identifier is the random access radio network temporary identifier RA-RNTI, and the terminal device executes non-contention-based random access, the terminal device starts or restarts the timer. When the scrambling identifier is the RA-RNTI, and the terminal device executes contention-based random access, the terminal device controls the timer to maintain an original state.

In the manner 2, receiving a random access response by the terminal device in the contention-based random access process does not mean that contention is successfully addressed, to be specific, the random access process may fail. If the timer is started immediately after the first message scrambled by using the RA-RNTI is received, the timer may expire in the random access process, or the timer may be incorrectly in the running state when random access fails. Therefore, when determining that the scrambling identifier of the first message is the RA-RNTI and the terminal device executes contention-based random access, the terminal device does not start or restart the timer, that is, the timer maintains the original state. In contrast, receiving a random access response by the terminal device in the non-contention-based random access process means that contention is successfully addressed. Therefore, when determining that the scrambling identifier of the first message is the RA-RNTI and the terminal executes non-contention-based random access, the terminal device directly controls the timer to start or restart, or starts or restarts the timer after the first message scrambled by using the C-RNTI is dynamically received for the first time. This avoids a case in which the timer expires in the random access process or a case in which the timer is incorrectly in the running state when random access fails, and resolves a problem that the terminal device cannot correctly switch to the default downlink BWP and power consumption of the terminal device cannot be reduced, thereby reducing the power consumption of the terminal device.

Manner 3: When the scrambling identifier is a first scrambling identifier, the terminal device starts or restarts the timer.

The first scrambling identifier is any one or a combination of a cell radio network temporary identifier C-RNTI, a configured scheduling radio network temporary identifier CS-RNTI, a paging radio network temporary identifier P-RNTI, and a system information radio network temporary identifier SI-RNTI.

It should be noted that, the first scrambling identifier may be any one or a combination of the foregoing four radio network temporary identifiers. To be specific, any one of the foregoing four radio network temporary identifiers may be selected to scramble the first message, or any two or three of the foregoing four radio network temporary identifiers may be selected to scramble the first message. Certainly, alternatively, the foregoing four radio network temporary identifiers may all be selected to scramble the first message.

Similarly, in the manner 3, after receiving the first message, the terminal device judges the scrambling identifier used to scramble the first message. If the scrambling identifier is the first scrambling identifier, it indicates that the terminal device may start or restart the timer. In this case, the terminal device starts or restarts the timer based on the scrambling identifier. This resolves a problem that the terminal device cannot correctly switch to the default downlink BWP and power consumption of the terminal device cannot be reduced, thereby reducing the power consumption of the terminal device.

According to the timer processing method provided in this embodiment of the present invention, during determining of whether to start or restart a timer, the terminal device receives the first message sent by the network device. If the active downlink bandwidth part BWP of the terminal device is not the default downlink BWP, the terminal device starts or restarts a timer based on the scrambling identifier of the first message, wherein the timer is a timer used by the terminal device to switch from the active downlink BWP to the default downlink BWP, or the timer is a timer used by the terminal device to activate the default downlink BWP and deactivate the active downlink BWP. If the active BWP pair of the terminal device is not the default BWP pair, the terminal device starts or restarts a timer based on the scrambling identifier of the first message, wherein the timer is a timer used by the terminal device to switch from the active BWP pair to the default BWP pair, or the timer is a timer used by the terminal device to activate the default BWP pair and deactivate the active BWP pair. This resolves a problem that the terminal device cannot correctly switch to the default downlink BWP and power consumption of the terminal device cannot be reduced, thereby reducing the power consumption of the terminal device.

Figure 3:
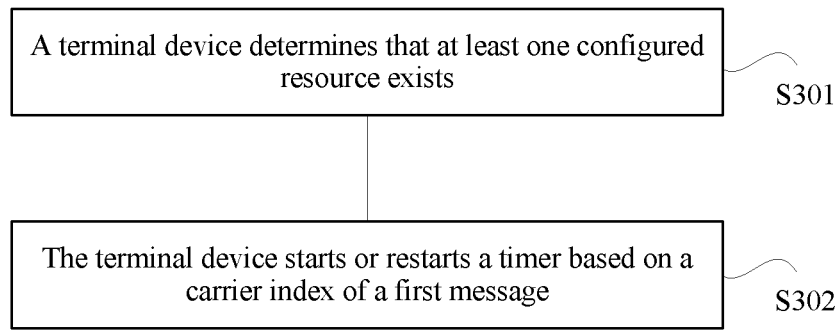
FIG. 3 is a schematic diagram of another timer processing method according to an embodiment of this application.

The embodiment shown in FIG. 2 describes in detail the solution about how the terminal device determines, based on the scrambling identifier of the first message, whether to start or restart a timer. The following describes in detail another possible implementation in which the terminal device may determine, based on a carrier index of the first message, whether to start or restart a timer. For example, the timer processing method is applicable to a carrier aggregation scenario. FIG. 3 is a schematic diagram of another timer processing method according to an embodiment of the present invention. The timer processing method may include the following steps.

S301: A terminal device receives a first message sent by a network device.

The first message indicates a downlink assignment or an uplink grant, or the first message is used to indicate bandwidth part BWP switching.

It should also be noted that, the first message may be a message such as downlink control information carried on a PDCCH. Receiving the first message may be understood as receiving the PDCCH, or receiving the downlink control information, or receiving the downlink control information carried on the PDCCH, or receiving the downlink control information sent by using the PDCCH. In a paired spectrum scenario, the first message indicates a downlink assignment, or the first message indicates BWP switching and a downlink BWP that is switched to is not a default downlink BWP. In an unpaired spectrum scenario, because an uplink BWP and a downlink BWP appear in pairs, that is, a pair of uplink and downlink BWPs are both switched during BWP switching, a default BWP may be considered as including a pair of uplink and downlink BWPs. In this case, the first message indicates a downlink assignment or an uplink grant (uplink grant), or the first message indicates BWP switching and a BWP pair that is switched to is not a default BWP pair.

S302: The terminal device starts or restarts a timer based on a carrier index of the first message.

The timer is a timer used by the terminal device to switch from an active downlink BWP to a default downlink BWP, or the timer is a timer used by the terminal device to activate a default downlink BWP and deactivate an active downlink BWP, or the timer is a timer used by the terminal device to switch from an active BWP pair to the default BWP pair, or the timer is a timer used by the terminal device to activate the default BWP pair and deactivate an active BWP pair.

It should be noted that, the carrier index of the first message herein may be understood as a carrier index in the first message, or a carrier index indicated by the first message, or a carrier index included by the first message, or certainly, a carrier index carried by the first message.

The paired spectrum scenario and the unpaired spectrum scenario are different, and therefore timers started or restarted based on the carrier index of the first message are also different. A detailed description is as follows.

In one scenario, namely, the paired spectrum scenario, if the active downlink BWP of the terminal device is not the default downlink BWP and the active downlink BWP of the terminal device is a downlink BWP of a carrier or a serving cell indicated by the carrier index, the timer is a timer of the carrier or the serving cell.

The timer is a timer used by the terminal device to switch from the active downlink BWP to the default downlink BWP, or the timer is a timer used by the terminal device to activate the default downlink BWP and deactivate the active downlink BWP.

In the paired spectrum scenario, if the first message indicates a downlink assignment and does not indicate BWP switching, it may be considered that the active downlink BWP of the terminal device is a downlink BWP used for receiving the first message; or if the first message indicates bandwidth part BWP switching, it may be considered that the active downlink BWP of the terminal device is a downlink BWP that is switched to. Alternatively, it may be considered that the active downlink BWP of the terminal device is a BWP indicated by the first message, for example, an active downlink BWP indicated in the downlink control information.

In the paired spectrum scenario, if the active downlink bandwidth part BWP of the terminal device is not the default downlink BWP, and the active downlink BWP of the terminal device is a downlink BWP of a carrier or a serving cell indicated by the carrier index, or the active downlink BWP of the terminal device is a downlink BWP of a carrier or a serving cell with data transmitted, the timer is a timer of the carrier or the serving cell indicated by the carrier index. For example, with cross-carrier scheduling in the carrier aggregation scenario, the carrier or the serving cell indicated by the carrier index is different from a carrier or a serving cell used for receiving the first message. The terminal device receives the first message on a carrier 1 or in a serving cell 1, and the carrier or the serving cell indicated by the carrier index of the first message is a carrier 2 or a serving cell 2. If the downlink BWP of the carrier or the serving cell indicated by the carrier index is not the default downlink BWP, the timer is the timer of the carrier or the serving cell indicated by the carrier index, namely, a timer of the carrier 2 or the serving cell 2.

Optionally, further, if the active downlink BWP of the terminal device is not the default downlink BWP and the active downlink BWP of the terminal device is a downlink BWP of the carrier or the serving cell used for receiving the first message, the timer is a timer of the carrier or the serving cell used for receiving the first message. For example, with cross-carrier scheduling in the carrier aggregation scenario, the carrier or the serving cell indicated by the carrier index is different from a carrier or a serving cell used for receiving the first message. The terminal device receives the first message on a carrier 1 or in a serving cell 1, and the carrier or the serving cell indicated by the carrier index of the first message is a carrier 2 or a serving cell 2. If the downlink BWP of the carrier or the serving cell indicated by the carrier index is not the default downlink BWP, the timer is the timer of the carrier or the serving cell indicated by the carrier index, namely, a timer of the carrier 2 or the serving cell 2. If the downlink BWP of the carrier or the serving cell used for receiving the first message is not the default downlink BWP, the timer is the timer of the carrier or the serving cell used for receiving the first message, namely, a timer of the carrier 1 or the serving cell 1. In other words, when the foregoing conditions are met, started or restarted timers include the timer of the carrier or the serving cell indicated by the carrier index and the timer of the carrier or the serving cell used for receiving the first message. This resolves a problem that the terminal device cannot correctly switch to the default downlink BWP and power consumption of the terminal device cannot be reduced, thereby reducing the power consumption of the terminal device.

In another scenario, namely, the unpaired spectrum scenario, if the active BWP pair of the terminal device is not the default BWP pair and the active BWP pair of the terminal device is a BWP pair of a carrier or a serving cell indicated by the carrier index, the timer is a timer of the carrier or the serving cell.

The timer is a timer used by the terminal device to switch from the active BWP pair to the default BWP pair, or the timer is a timer used by the terminal device to activate the default BWP pair and deactivate the active BWP pair.

In the unpaired spectrum scenario, if the first message indicates a downlink assignment or an uplink grant and does not indicate BWP switching, it may be considered that the active BWP pair of the terminal device is a BWP pair that is corresponding to a downlink BWP used for receiving the first message or a BWP pair to which a downlink BWP used for receiving the first message belongs; or if the first message indicates bandwidth part BWP switching, it may be considered that the active BWP pair of the terminal device is a BWP pair that is switched to. Alternatively, it may be considered that the active BWP pair of the terminal device is a BWP pair indicated by the first message, for example, an active BWP pair indicated in the downlink control information. Alternatively, it may be considered that the active BWP pair of the terminal device is a BWP pair that is corresponding to a downlink BWP indicated by the first message or a BWP pair to which a downlink BWP indicated by the first message belongs, for example, an active BWP pair that is corresponding to a downlink BWP indicated in the downlink control information or an active BWP pair to which a downlink BWP indicated in the downlink control information belongs.

In the unpaired spectrum scenario, if the active bandwidth part BWP pair of the terminal device is not the default BWP pair, and the active BWP pair of the terminal device is a BWP pair of a carrier or a serving cell indicated by the carrier index, or the active BWP pair of the terminal device is a BWP pair of a carrier or a serving cell with data transmitted, the timer is a timer of the carrier or the serving cell indicated by the carrier index. For example, with cross-carrier scheduling in the carrier aggregation scenario, the carrier or the serving cell indicated by the carrier index is different from a carrier or a serving cell used for receiving the first message. The terminal device receives the first message on a carrier 1 or in a serving cell 1, and the carrier or the serving cell indicated by the carrier index of the first message is a carrier 2 or a serving cell 2. If the BWP pair of the carrier or the serving cell indicated by the carrier index is not the default BWP pair, the timer is the timer of the carrier or the serving cell indicated by the carrier index, namely, a timer of the carrier 2 or the serving cell 2.

Optionally, further, if the active BWP pair of the terminal device is not the default BWP pair and the active BWP pair of the terminal device is a BWP pair of the carrier or the serving cell used for receiving the first message, the timer is a timer of the carrier or the serving cell used for receiving the first message. For example, with cross-carrier scheduling in the carrier aggregation scenario, the carrier or the serving cell indicated by the carrier index is different from a carrier or a serving cell used for receiving the first message. The terminal device receives the first message on a carrier 1 or in a serving cell 1, and the carrier or the serving cell indicated by the carrier index of the first message is a carrier 2 or a serving cell 2. If the BWP pair of the carrier or the serving cell indicated by the carrier index is not the default BWP pair, the timer is the timer of the carrier or the serving cell indicated by the carrier index, namely, a timer of the carrier 2 or the serving cell 2. If the BWP pair of the carrier or the serving cell used for receiving the first message is not the default BWP pair, the timer is the timer of the carrier or the serving cell used for receiving the first message, namely, a timer of the carrier 1 or the serving cell 1. In other words, when the foregoing conditions are met, started or restarted timers include the timer of the carrier or the serving cell indicated by the carrier index and the timer of the carrier or the serving cell used for receiving the first message. This resolves a problem that the terminal device cannot correctly switch to the default downlink BWP and power consumption of the terminal device cannot be reduced, thereby reducing the power consumption of the terminal device.

According to the timer processing method provided in this embodiment of the present invention, during determining of whether to start or restart a timer, the terminal device receives the first message sent by the network device. The terminal device starts or restarts the timer based on the carrier index of the first message, wherein the timer is a timer used by the terminal device to switch from the active downlink BWP to the default downlink BWP, or the timer is a timer used by the terminal device to activate the default downlink BWP and deactivate the active downlink BWP, or the timer is a timer used by the terminal device to switch from the active BWP pair to the default BWP pair, or the timer is a timer used by the terminal device to activate the default BWP pair and deactivate the active BWP pair. This resolves a problem that the terminal device cannot correctly switch to the default downlink BWP and power consumption of the terminal device cannot be reduced, thereby reducing the power consumption of the terminal device.

Figure 4:
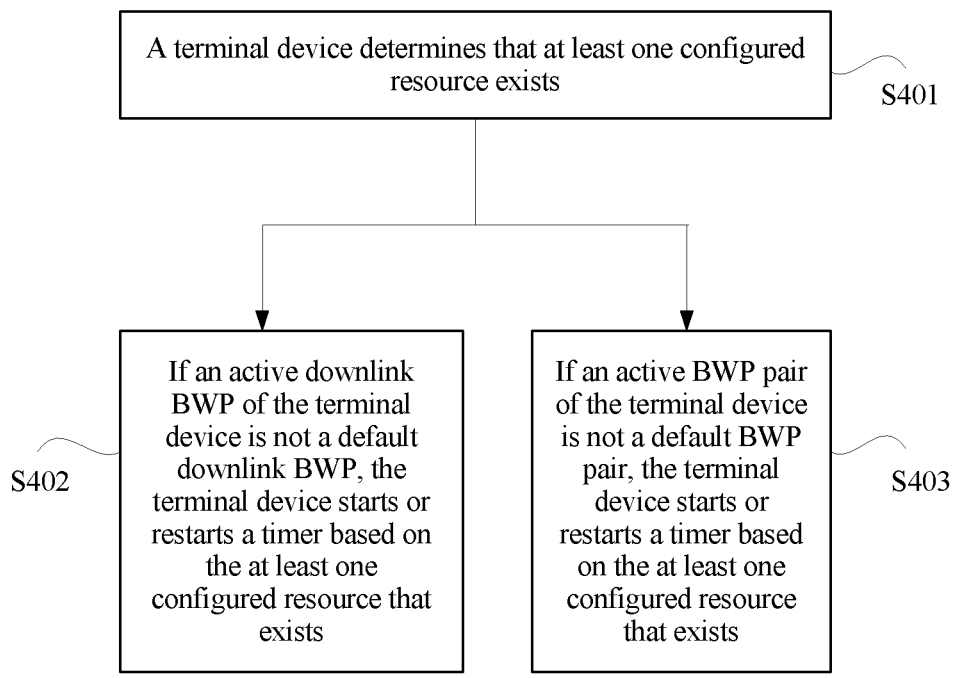
FIG. 4 is a schematic diagram of another timer processing method according to an embodiment of this application.

The embodiment shown in FIG. 3 describes in detail the solution about how the terminal device determines, based on the carrier index of the first message, whether to start or restart a timer. In addition, a timer is started or restarted only when a PDCCH is received in the prior art. Therefore, there is no timer restart condition in a non-dynamic scheduling process, and the terminal device may fall back to a default BWP in the non-dynamic scheduling process. Consequently, current data transmission of the terminal device is affected. Therefore, in an embodiment of the present invention, a description about how to start or restart a timer in the non-dynamic scheduling process is added. FIG. 4 is a schematic diagram of another timer processing method according to an embodiment of the present invention. The timer processing method may include the following steps.

S401: A terminal device determines that at least one configured resource exists.

It should also be noted that, in a paired spectrum scenario, an active downlink BWP of the terminal device is not a default downlink BWP. In an unpaired spectrum scenario, because an uplink BWP and a downlink BWP appear in pairs, that is, a pair of uplink and downlink BWPs are both switched during BWP switching, a default BWP may be considered as including a pair of uplink and downlink BWPs. In this case, an active BWP pair of the terminal device is not a default BWP pair.

It should be noted that, that at least one configured resource exists herein may be understood as the following: there is at least one configured resource, or at least one configured resource appears, or certainly, at least one configured resource occurs, or the like.

As there are different scenarios, methods for starting or restarting, by the terminal device, a timer based on the at least one configured resource that exists are different, and respectively correspond to S402 and S403.

S402: If an active downlink BWP of the terminal device is not a default downlink BWP, the terminal device starts or restarts a timer based on the at least one configured resource that exists.

The timer is a timer used by the terminal device to switch from the active downlink BWP to the default downlink BWP, or the timer is a timer used by the terminal device to activate the default downlink BWP and deactivate the active downlink BWP.

In the solution shown in S402, in the paired spectrum scenario, if the active downlink BWP of the terminal device is not the default downlink BWP and the configured resource is a downlink resource, the terminal device may start or restart the timer based on the at least one configured resource that exists.

Optionally, that the terminal device starts or restarts a timer based on the at least one configured resource that exists in S402 may include the following possible manners:

Manner 1: The terminal device starts or restarts the timer when the terminal device determines that the at least one configured resource exists.

In the manner 1, for example, with non-dynamic scheduling, for example, downlink semi-persistent scheduling (Semi-Persistent Scheduling, SPS), when the terminal device determines that at least one configured downlink resource exists, that is, at least one configured downlink assignment (downlink assignment) exists, the terminal device starts or restarts the timer, wherein the timer is a timer used by the terminal device to switch from the active downlink BWP to the default downlink BWP, or the timer is a timer used by the terminal device to activate the default downlink BWP and deactivate the active downlink BWP. This avoids a prior-art problem that the terminal device may fall back to a default BWP in a non-dynamic scheduling process because a timer is started or restarted only when a PDCCH is received, thereby avoiding impact on current data transmission of the terminal device. It should be noted that, the at least one configured resource is at least one configured resource on the active downlink BWP of the terminal device.

The manner 1 describes direct timer start or restart performed when at least one configured resource exists. Certainly, whether data is transmitted on the configured resource may further be determined, to determine whether to start or restart the timer, as described in a manner 2 below:

Manner 2: When determining that there is data transmitted on the configured resource, the terminal device starts or restarts the timer.

In the manner 2, the terminal device does not start or restart the timer after determining that at least one configured resource exists. Instead, the terminal device further determines whether data is transmitted on the configured resource. For example, with non-dynamic scheduling, for example, downlink semi-persistent scheduling (Semi-Persistent Scheduling, SPS), when the terminal device determines that downlink data is transmitted on at least one configured downlink resource, that is, downlink data is transmitted on at least one configured downlink assignment (downlink assignment), the terminal device starts or restarts the timer, wherein the timer is a timer used by the terminal device to switch from the active downlink BWP to the default downlink BWP, or the timer is a timer used by the terminal device to activate the default downlink BWP and deactivate the active downlink BWP. This avoids a prior-art problem that the terminal device may fall back to a default BWP in a non-dynamic scheduling process because a timer is started or restarted only when a PDCCH is received, thereby avoiding impact on current data transmission of the terminal device. It should be noted that, the data transmission is data transmission on the active downlink BWP of the terminal device.

S403: If an active BWP pair of the terminal device is not a default BWP pair, the terminal device starts or restarts a timer based on the at least one configured resource that exists.

The timer is a timer used by the terminal device to switch from the active BWP pair to the default BWP pair, or the timer is a timer used by the terminal device to activate the default BWP pair and deactivate the active BWP pair.

In the solution shown in S403, in the unpaired spectrum scenario, if the active BWP pair of the terminal device is not the default BWP pair and the configured resource is a downlink resource or an uplink resource, the terminal device may start or restart the timer based on the at least one configured resource that exists.

Optionally, that the terminal device starts or restarts a timer based on the at least one configured resource that exists in S403 may include the following possible manners:

Manner 1: The terminal device starts or restarts the timer when the terminal device determines that the at least one configured resource exists.

In the manner 1, for example, with non-dynamic scheduling, for example, downlink semi-persistent scheduling (Semi-Persistent Scheduling, SPS), grant free (Grant Free, GF) scheduling, or uplink semi-persistent scheduling, wherein the grant free (Grant Free, GF) scheduling is also referred to as a configured grant type 1 (configured grant Type 1) and the uplink semi-persistent scheduling is also referred to as a configured grant type 2 (configured grant Type 2), when the terminal device determines that at least one configured downlink resource or configured uplink resource exists, that is, at least one configured downlink assignment (downlink assignment) exists or at least one configured uplink grant (uplink grant) exists, the terminal device starts or restarts the timer, wherein the timer is a timer used by the terminal device to switch from the active downlink BWP pair to the default downlink BWP pair, or the timer is a timer used by the terminal device to activate the default BWP pair and deactivate the active BWP pair. This avoids a prior-art problem that the terminal device may fall back to a default BWP in a non-dynamic scheduling process because a timer is started or restarted only when a PDCCH is received, thereby avoiding impact on current data transmission of the terminal device. It should be noted that, the at least one configured resource is at least one configured resource on the active BWP pair of the terminal device.

The manner 1 describes direct timer start or restart performed when at least one configured resource exists. Certainly, whether data is transmitted on the configured resource may further be determined, to determine whether to start or restart the timer, as described in a manner 2 below:

Manner 2: When the terminal device transmits data on the determined configured resource, the terminal device starts or restarts the timer.

In the manner 2, the terminal device does not start or restart the timer after determining that at least one configured resource exists. Instead, the terminal device further determines whether data is transmitted on the configured resource. For example, with non-dynamic scheduling, for example, downlink semi-persistent scheduling (Semi-Persistent Scheduling, SPS), grant free (Grant Free, GF) scheduling, or uplink semi-persistent scheduling, wherein the grant free (Grant Free, GF) scheduling is also referred to as a configured grant type 1 (configured grant Type 1) and the uplink semi-persistent scheduling is also referred to as a configured grant type 2 (configured grant Type 2), when the terminal device determines that downlink data is transmitted on at least one configured downlink resource, that is, downlink data is transmitted on at least one configured downlink assignment (downlink assignment), the terminal device starts or restarts the timer; or when the terminal device determines that uplink data is transmitted on at least one configured uplink resource, that is, uplink data is transmitted on at least one configured uplink grant (uplink grant), the terminal device starts or restarts the timer, wherein the timer is a timer used by the terminal device to switch from the active BWP pair to the default BWP pair, or the timer is a timer used by the terminal device to activate the default downlink BWP pair and deactivate the active downlink BWP pair. This avoids a prior-art problem that the terminal device may fall back to a default BWP in a non-dynamic scheduling process because a timer is started or restarted only when a PDCCH is received, thereby avoiding impact on current data transmission of the terminal device. It should be noted that, the data transmission is data transmission on the active BWP pair of the terminal device.

It should be noted that, in one scheduling process, only either S402 or S403 is executed after S401 is executed, in other words, S402 and S403 are not synchronously executed.

According to the timer processing method provided in this embodiment of the present invention, during determining of whether to start or restart a timer, the terminal device determines that at least one configured resource exists or determines that data is transmitted on the at least one configured resource. If the active downlink BWP of the terminal device is not the default downlink BWP, the terminal device starts or restarts the timer based on the at least one configured resource that exists or the terminal device starts or restarts the timer based on a fact that data is transmitted on the at least one configured resource, wherein the timer is a timer used by the terminal device to switch from the active downlink BWP to the default downlink BWP, or the timer is a timer used by the terminal device to activate the default downlink BWP and deactivate the active downlink BWP; if the active BWP pair of the terminal device is not the default BWP pair, the terminal device starts or restarts the timer based on the at least one configured resource that exists or the terminal device starts or restarts the timer based on a fact that data is transmitted on the at least one configured resource, wherein the timer is a timer used by the terminal device to switch from the active BWP pair to the default BWP pair, or the timer is a timer used by the terminal device to activate the default BWP pair and deactivate the active BWP pair. This resolves a problem that the terminal device falls back to a default BWP in a non-dynamic scheduling process, thereby avoiding impact on current data transmission of the terminal device.

It should be noted that, the timer in the embodiments shown in FIG. 2 to FIG. 4 may further be another type of timer. The another type of timer may be a timer used by the terminal device to deactivate the active downlink BWP, or the another type of timer may be used by the terminal device to deactivate the active BWP pair of the terminal device. In addition, it should be noted that, the downlink BWP in the paired spectrum scenario may represent a downlink BWP in a BWP pair, and may also represent an uplink BWP paired with the downlink BWP, in other words, the downlink BWP may be understood as a BWP pair corresponding to the downlink BWP.

The embodiments shown in FIG. 2 to FIG. 4 describe in detail the technical solutions about how to start or restart a timer when the timer is associated with a serving cell. The following describes in detail how the terminal device starts or restarts a timer when the timer is associated with a BWP in a second association scenario.

Figure 5:
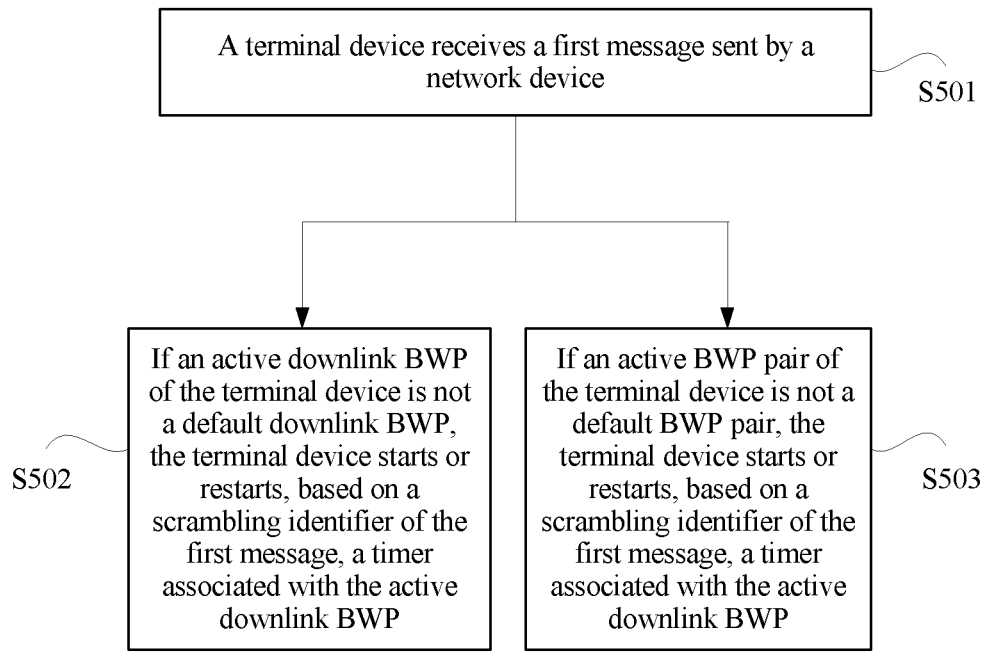
FIG. 5 is a schematic diagram of another timer processing method according to an embodiment of this application.

In one possible implementation, the terminal device may determine, based on the scrambling identifier of the first message, whether to start or restart the timer. FIG. 5 is a schematic diagram of a timer processing method according to an embodiment of this application. The timer processing method may include the following steps.

S501: A terminal device receives a first message sent by a network device.

The first message indicates a downlink assignment or an uplink grant, or the first message indicates bandwidth part BWP switching.

It should be noted that, the first message may be a message such as downlink control information carried on a PDCCH. For example, receiving the first message may be understood as receiving the PDCCH, or receiving the downlink control information, or receiving the downlink control information carried on the PDCCH, or receiving the downlink control information sent by using the PDCCH. In a paired spectrum scenario, the first message may indicate a downlink assignment. When the first message indicates a downlink assignment, whether to start or restart a timer further needs to be determined. Alternatively, the first message may indicate an uplink grant. When the first message indicates an uplink grant, a timer is not started or restarted. Certainly, the first message may also indicate BWP switching, and a downlink BWP that is switched to is not a default downlink BWP. In an unpaired spectrum scenario, because an uplink BWP and a downlink BWP appear in pairs, that is, a pair of uplink and downlink BWPs are both switched during BWP switching, a default BWP may be considered as including a pair of uplink and downlink BWPs. In this case, the first message indicates a downlink assignment or an uplink grant (uplink grant), or the first message indicates BWP switching and a BWP pair that is switched to is not a default BWP pair.

The paired spectrum scenario and the unpaired spectrum scenario are different, and therefore methods for starting or restarting a timer based on a scrambling identifier of the first message are also different and respectively correspond to S202 and S203.

S502: If an active downlink BWP of the terminal device is not a default downlink BWP, the terminal device starts or restarts, based on a scrambling identifier of the first message, a timer associated with the active downlink BWP.

The timer is a timer used by the terminal device to switch from the active downlink BWP to the default downlink BWP, or the timer is a timer used by the terminal device to activate the default downlink BWP and deactivate the active downlink BWP.

In the paired spectrum scenario, if the first message indicates a downlink assignment and does not indicate BWP switching, it may be considered that the active downlink BWP of the terminal device is a downlink BWP used for receiving the first message; or if the first message indicates bandwidth part BWP switching, it may be considered that the active downlink BWP of the terminal device is a downlink BWP that is switched to. Alternatively, it may be considered that the active downlink BWP of the terminal device is a BWP indicated by the first message, for example, an active downlink BWP indicated in the downlink control information.

It should be noted that, the scrambling identifier of the first message herein is a radio network temporary identifier used to scramble a cyclic redundancy check (Cyclic Redundancy Check, CRC) code of the first message. For example, when the first message is downlink control information, the scrambling identifier is a radio network temporary identifier used to scramble a cyclic redundancy check code of the downlink control information. Scrambling the first message may be understood as scrambling the cyclic redundancy check code of the first message.

It should be noted that, in the paired spectrum scenario in which a timer is associated with a BWP, if the active downlink BWP of the terminal device is not the default downlink BWP, when the terminal device starts or restarts the timer based on the scrambling identifier of the first message, the timer is the timer associated with the active downlink BWP of the terminal device. The following two possibilities may be included:

Possibility 1: When the first message indicates a downlink assignment and does not indicate BWP switching, it may be considered that the active downlink BWP of the terminal device is a downlink BWP used for receiving the first message, and the timer is a timer associated with the downlink BWP used by the terminal device for receiving the first message.

Possibility 2: When the first message indicates BWP switching and a downlink BWP that is switched to is not the default downlink BWP, it may be considered that the active downlink BWP of the terminal device is the downlink BWP that is switched to, and the timer is a timer associated with the downlink BWP that the terminal device is switched to. For example, the terminal device has two timers, which are a timer 1 and a timer 2, and the timer 1 is associated with a downlink BWP 1 and the timer 2 is associated with a downlink BWP 2. After the terminal device receives a first message used to indicate switching from the current active downlink BWP 1 to the downlink BWP 2 that is not the default downlink BWP, the terminal device needs to switch from the current downlink BWP 1 to the downlink BWP 2. When the terminal device determines to deactivate the active downlink BWP 1, the terminal device stops the timer associated with the to-be-deactivated downlink BWP 1, to be specific, when the terminal device determines to activate the downlink BWP 2 and deactivate the downlink BWP 1, correspondingly, the terminal device needs to start or restart the timer 2 associated with the to-be-activated downlink BWP 2 and stops the timer 1 associated with the to-be-deactivated downlink BWP 1. It should be noted that, in this embodiment of this application, the method may further include: When the terminal device determines to deactivate the active downlink BWP, the terminal device stops the timer associated with the to-be-deactivated downlink BWP; or when the terminal device determines to deactivate an active BWP pair, the terminal device stops a timer associated with the to-be-deactivated BWP pair. The terminal device determines, based on the first message, to deactivate the active downlink BWP, and stops the timer associated with the to-be-deactivated downlink BWP. In addition, when determining that the timer expires, the terminal device determines to deactivate the active downlink BWP and stops the timer associated with the to-be-deactivated downlink BWP.

In the solution shown in S502, after the terminal device receives the first message indicating a downlink assignment, or after the terminal device receives the first message indicating BWP switching and the downlink BWP that is switched to is not the default downlink BWP, if the active downlink BWP of the terminal device is not the default downlink BWP in this case, the terminal device may start or restart the timer based on the scrambling identifier of the first message, wherein the timer is a timer used by the terminal device to switch from the active downlink BWP to the default downlink BWP, or the timer is a timer used by the terminal device to activate the default downlink BWP and deactivate the active downlink BWP. This avoids prior-art practice that a timer is directly started or restarted after a PDCCH is directly received, and resolves a problem that the terminal device cannot correctly switch to the default downlink BWP and power consumption of the terminal device cannot be reduced, thereby reducing the power consumption of the terminal device.

S503: If an active BWP pair of the terminal device is not a default BWP pair, the terminal device starts or restarts, based on a scrambling identifier of the first message, a timer associated with the active BWP pair.

The timer is a timer used by the terminal device to switch from the active BWP pair to the default BWP pair, or the timer is a timer used by the terminal device to activate the default BWP pair and deactivate the active BWP pair.

In the unpaired spectrum scenario, if the first message indicates a downlink assignment or an uplink grant and does not indicate BWP switching, it may be considered that the active BWP pair of the terminal device is a BWP pair that is corresponding to a downlink BWP used for receiving the first message or a BWP pair to which a downlink BWP used for receiving the first message belongs; or if the first message indicates bandwidth part BWP switching, it may be considered that the active BWP pair of the terminal device is a BWP pair that is switched to. Alternatively, it may be considered that the active BWP pair of the terminal device is a BWP pair indicated by the first message, for example, an active BWP pair indicated in the downlink control information. Alternatively, it may be considered that the active BWP pair of the terminal device is a BWP pair that is corresponding to a downlink BWP indicated by the first message or a BWP pair to which a downlink BWP indicated by the first message belongs, for example, an active BWP pair that is corresponding to a downlink BWP indicated in the downlink control information or an active BWP pair to which a downlink BWP indicated in the downlink control information belongs.

It should be noted that, in the unpaired spectrum scenario in which a timer is associated with a BWP, if the active BWP pair of the terminal device is not the default BWP pair, when the terminal device starts or restarts the timer based on the scrambling identifier of the first message, the timer is the timer associated with the active BWP pair of the terminal device. The following two possibilities may be included:

Possibility 1: When the first message indicates a downlink assignment or an uplink grant and does not indicate BWP switching, it may be considered that the active downlink BWP of the terminal device is a downlink BWP used for receiving the first message, and the timer is a timer associated with a BWP pair used by the terminal device for receiving the first message, or the timer is a timer associated with a BWP pair corresponding to the downlink BWP used by the terminal device for receiving the first message.

Possibility 2: When the first message indicates BWP switching and a BWP pair that is switched to is not the default BWP pair, it may be considered that the active BWP pair of the terminal device is the BWP pair that is switched to, and the timer is a timer associated with the BWP pair that the terminal device is switched to. For example, the terminal device has two timers, which are a timer 3 and a timer 4, and the timer 3 is associated with a BWP 3 pair and the timer 4 is associated with a BWP 4 pair. After the terminal device receives a first message used to indicate switching from the current active BWP 3 pair to the BWP 4 pair that is not the default BWP pair, the terminal device needs to switch from the current BWP 3 pair to the BWP 4 pair. When the terminal device determines to deactivate the active BWP 3 pair, the terminal device stops the timer associated with the to-be-deactivated BWP 3 pair, to be specific, when the terminal device determines to activate the BWP 4 pair and deactivate the BWP 3 pair, correspondingly, the terminal device needs to start or restart the timer 4 associated with the to-be-activated BWP 4 pair and stops the timer 3 associated with the to-be-deactivated BWP 3 pair. It should be noted that, in this embodiment of this application, the method may further include: When the terminal device determines to deactivate the active downlink BWP, the terminal device stops the timer associated with the to-be-deactivated downlink BWP; or when the terminal device determines to deactivate the active BWP pair, the terminal device stops the timer associated with the to-be-deactivated BWP pair. The terminal device determines, based on the first message, to deactivate the active BWP pair, and stops the timer associated with the to-be-deactivated BWP pair. In addition, when determining that the timer expires, the terminal device determines to deactivate the active BWP pair and stops the timer associated with the to-be-deactivated BWP pair.

In the solution shown in S503, after the terminal device receives the first message indicating an uplink grant or a downlink assignment, or after the terminal device receives the first message indicating BWP switching and the BWP pair that is switched to is not the default BWP pair, if the active BWP pair of the terminal device is not the default BWP pair in this case, the terminal device may start or restart the timer based on the scrambling identifier of the first message, wherein the timer is a timer used by the terminal device to switch from the active BWP pair to the default BWP pair, or the timer is a timer used by the terminal device to activate the default BWP pair and deactivate the active BWP pair. This avoids prior-art practice that a timer is directly started or restarted after a PDCCH is directly received, and resolves a problem that the terminal device cannot correctly switch to the default BWP pair and power consumption of the terminal device cannot be reduced, thereby reducing the power consumption of the terminal device.

It should be noted that, in one scheduling process, only either S502 or S503 is executed after S501 is executed, in other words, S502 and S503 are not synchronously executed.

In S502 or S503 above, a different active BWP of the terminal device leads to a different manner of starting or restarting the timer based on the scrambling identifier of the first message. However, control conditions for starting or restarting the timer in these two manners are the same, to be specific, control conditions for the terminal device to start or restart the timer based on the scrambling identifier of the first message in S502 and S503 are the same. The terminal device may start or restart the timer based on the scrambling identifier of the first message in the following possible manners:

Manner 1: The terminal device starts or restarts the timer when the scrambling identifier is not a random access radio network temporary identifier RA-RNTI or a temporary cell radio network temporary identifier TC-RNTI.

It should be noted that, for the RA-RNTI, the timer needs to be stopped in a random access triggering process. In other words, that the timer is in a running state is not expected in a random access process, to avoid a case in which the timer expires in the random access process. The first message scrambled by using the RA-RNTI schedules a random access response (Random Access Response, RAR), that is, a message 2 in the random access process. In a contention-based random access process, receiving an RAR does not mean that contention is successfully addressed, that is, the random access process may fail. If a timer is started immediately after the first message scrambled by using the RA-RNTI is received, the timer may expire in the random access process, or the timer may be incorrectly in the running state when random access fails.

It should be noted that, for the TC-RNTI, only a contention-based random access process in which the terminal device is in an idle (idle) state occurs. In this case, the idle-state terminal device works on an initial BWP. A PDCCH scrambled by using a TC-RNTI schedules a message in a random access process. In this case, user equipment in the idle state has not received a configuration message of a base station, in other words, there is no concept of a default BWP. Therefore, the TC-RNTI is unrelated to timer start or restart.

In the manner 1, after receiving the first message, the terminal device determines whether the scrambling identifier that is used to scramble the first message is the RA-RNTI or TC-RNTI. If the scrambling identifier is not the RA-RNTI or TC-RNTI, it indicates that the terminal device may start or restart the timer. In this case, the terminal device starts or restarts the timer based on the scrambling identifier. This avoids a case in which the timer expires in the random access process or a case in which the timer is incorrectly in the running state when random access fails, and resolves a problem that the terminal device cannot correctly switch to the default downlink BWP and power consumption of the terminal device cannot be reduced, thereby reducing the power consumption of the terminal device.

The manner 1 describes a case in which the timer is directly started or restarted when the scrambling identifier of the first message is not the RA-RNTI. Conversely, if the scrambling identifier of the first message is the RA-RNTI, a manner of executing random access by the terminal device further needs to be determined, to determine whether to start or restart the timer, as described in a manner 2 below:

Manner 2: When the scrambling identifier is the random access radio network temporary identifier RA-RNTI, and the terminal device executes non-contention-based random access, the terminal device starts or restarts the timer. When the scrambling identifier is the RA-RNTI, and the terminal device executes contention-based random access, the terminal device controls the timer to maintain an original state.

In the manner 2, receiving a random access response by the terminal device in the contention-based random access process does not mean that contention is successfully addressed, to be specific, the random access process may fail. If the timer is started immediately after the first message scrambled by using the RA-RNTI is received, the timer may expire in the random access process, or the timer may be incorrectly in the running state when random access fails. Therefore, when determining that the scrambling identifier of the first message is the RA-RNTI and the terminal device executes contention-based random access, the terminal device does not start or restart the timer, that is, the timer maintains the original state. In contrast, receiving a random access response by the terminal device in the non-contention-based random access process means that contention is successfully addressed. Therefore, when determining that the scrambling identifier of the first message is the RA-RNTI and the terminal executes non-contention-based random access, the terminal device directly controls the timer to start or restart, or starts or restarts the timer after the first message scrambled by using the C-RNTI is dynamically received for the first time. This avoids a case in which the timer expires in the random access process or a case in which the timer is incorrectly in the running state when random access fails, and resolves a problem that the terminal device cannot correctly switch to the default downlink BWP and power consumption of the terminal device cannot be reduced, thereby reducing the power consumption of the terminal device.

Manner 3: When the scrambling identifier is a first scrambling identifier, the terminal device starts or restarts the timer.

The first scrambling identifier is any one or a combination of a cell radio network temporary identifier C-RNTI, a configured scheduling radio network temporary identifier CS-RNTI, a paging radio network temporary identifier P-RNTI, and a system information radio network temporary identifier SI-RNTI.

It should be noted that, the first scrambling identifier may be any one or a combination of the foregoing four radio network temporary identifiers. To be specific, any one of the foregoing four radio network temporary identifiers may be selected to scramble the first message, or any two or three of the foregoing four radio network temporary identifiers may be selected to scramble the first message. Certainly, alternatively, the foregoing four radio network temporary identifiers may all be selected to scramble the first message.

Similarly, in the manner 3, after receiving the first message, the terminal device determines the scrambling identifier used to scramble the first message. If the scrambling identifier is the first scrambling identifier, it indicates that the terminal device may start or restart the timer. In this case, the terminal device starts or restarts the timer based on the scrambling identifier. This resolves a problem that the terminal device cannot correctly switch to the default downlink BWP and power consumption of the terminal device cannot be reduced, thereby reducing the power consumption of the terminal device.

According to the timer processing method provided in this embodiment of the present invention, during determining of whether to start or restart a timer, the terminal device receives the first message sent by the network device. If the active downlink bandwidth part BWP of the terminal device is not the default downlink BWP, the terminal device starts or restarts a timer based on the scrambling identifier of the first message, wherein the timer is a timer used by the terminal device to switch from the active downlink BWP to the default downlink BWP, or the timer is a timer used by the terminal device to activate the default downlink BWP and deactivate the active downlink BWP. If the active BWP pair of the terminal device is not the default BWP pair, the terminal device starts or restarts a timer based on the scrambling identifier of the first message, wherein the timer is a timer used by the terminal device to switch from the active BWP pair to the default BWP pair, or the timer is a timer used by the terminal device to activate the default BWP pair and deactivate the active BWP pair. This resolves a problem that the terminal device cannot correctly switch to the default downlink BWP and power consumption of the terminal device cannot be reduced, thereby reducing the power consumption of the terminal device.

Figure 6:
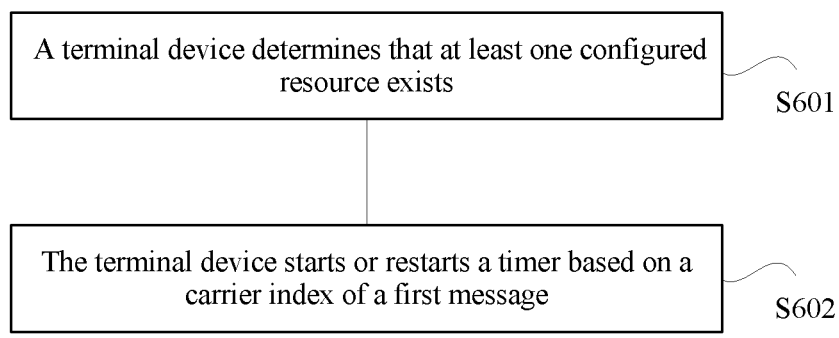
FIG. 6 is a schematic diagram of another timer processing method according to an embodiment of this application.

The embodiment shown in FIG. 5 describes in detail the solution about how the terminal device determines, based on the scrambling identifier of the first message, whether to start or restart a timer. The following describes in detail another possible implementation in which the terminal device may determine, based on a carrier index of the first message, whether to start or restart a timer. For example, the timer processing method is applicable to a carrier aggregation scenario. FIG. 6 is a schematic diagram of another timer processing method according to an embodiment of the present invention. The timer processing method may include the following steps.

S601: A terminal device receives a first message sent by a network device.

The first message indicates a downlink assignment or an uplink grant, or the first message is used to indicate bandwidth part BWP switching.

It should also be noted that, the first message may be a message such as downlink control information carried on a PDCCH. Receiving the first message may be understood as receiving the PDCCH, or receiving the downlink control information, or receiving the downlink control information carried on the PDCCH, or receiving the downlink control information sent by using the PDCCH. In a paired spectrum scenario, the first message indicates a downlink assignment, or the first message indicates BWP switching and a downlink BWP that is switched to is not a default downlink BWP. In an unpaired spectrum scenario, because an uplink BWP and a downlink BWP appear in pairs, that is, a pair of uplink and downlink BWPs are both switched during BWP switching, a default BWP may be considered as including a pair of uplink and downlink BWPs. In this case, the first message indicates a downlink assignment or an uplink grant (uplink grant), or the first message indicates BWP switching and a BWP pair that is switched to is not a default BWP pair.

S602: The terminal device starts or restarts a timer based on a carrier index of the first message.

The timer is a timer used by the terminal device to switch from an active downlink BWP to a default downlink BWP, or the timer is a timer used by the terminal device to activate a default downlink BWP and deactivate an active downlink BWP, or the timer is a timer used by the terminal device to switch from an active BWP pair to the default BWP pair, or the timer is a timer used by the terminal device to activate the default BWP pair and deactivate an active BWP pair.

It should be noted that, the carrier index of the first message herein may be understood as a carrier index in the first message, or a carrier index indicated by the first message, or a carrier index included by the first message, or certainly, a carrier index carried by the first message.

The paired spectrum scenario and the unpaired spectrum scenario are different, and therefore timers started or restarted based on the carrier index of the first message are also different. A detailed description is as follows.

In one scenario, namely, the paired spectrum scenario, if the active downlink BWP of the terminal device is not the default downlink BWP and the active downlink BWP of the terminal device is a downlink BWP of a carrier or a serving cell indicated by the carrier index, the timer is a timer of the carrier or the serving cell.

The timer is a timer used by the terminal device to switch from the active downlink BWP to the default downlink BWP, or the timer is a timer used by the terminal device to activate the default downlink BWP and deactivate the active downlink BWP. The following two possibilities may be included:

Possibility 1: When the first message indicates a downlink assignment and does not indicate BWP switching, it may be considered that the active downlink BWP of the terminal device is a downlink BWP used for receiving the first message, and the timer is a timer associated with the downlink BWP used by the terminal device for receiving the first message.

Possibility 2: When the first message indicates BWP switching and a downlink BWP that is switched to is not the default downlink BWP, it may be considered that the active downlink BWP of the terminal device is the downlink BWP that is switched to, and the timer is a timer associated with the downlink BWP that the terminal device is switched to. For example, the terminal device has two timers, which are a timer 1 and a timer 2, and the timer 1 is associated with a downlink BWP 1 and the timer 2 is associated with a downlink BWP 2. After the terminal device receives a first message used to indicate switching from the current active downlink BWP 1 to the downlink BWP 2 that is not the default downlink BWP, the terminal device needs to switch from the current downlink BWP 1 to the downlink BWP 2. When the terminal device determines to deactivate the active downlink BWP 1, the terminal device stops the timer associated with the to-be-deactivated downlink BWP 1, to be specific, when the terminal device determines to activate the downlink BWP 2 and deactivate the downlink BWP 1, correspondingly, the terminal device needs to start or restart the timer 2 associated with the to-be-activated downlink BWP 2 and stops the timer 1 associated with the to-be-deactivated downlink BWP 1. It should be noted that, in this embodiment of this application, the method may further include: When the terminal device determines to deactivate the active downlink BWP, the terminal device stops the timer associated with the to-be-deactivated downlink BWP; or when the terminal device determines to deactivate the active BWP pair, the terminal device stops the timer associated with the to-be-deactivated BWP pair. The terminal device determines, based on the first message, to deactivate the active downlink BWP, and stops the timer associated with the to-be-deactivated downlink BWP. In addition, when determining that the timer expires, the terminal device determines to deactivate the active downlink BWP and stops the timer associated with the to-be-deactivated downlink BWP.

In the paired spectrum scenario, if the first message indicates a downlink assignment and does not indicate BWP switching, it may be considered that the active downlink BWP of the terminal device is a downlink BWP used for receiving the first message; or if the first message indicates bandwidth part BWP switching, it may be considered that the active downlink BWP of the terminal device is a BWP that is switched to. Alternatively, it may be considered that the active downlink BWP of the terminal device is a BWP indicated by the first message, for example, an active downlink BWP indicated in the downlink control information.

In the paired spectrum scenario, if the active downlink bandwidth part BWP of the terminal device is not the default downlink BWP, and the active downlink BWP of the terminal device is a downlink BWP of a carrier or a serving cell indicated by the carrier index, or the active downlink BWP of the terminal device is a downlink BWP of a carrier or a serving cell with data transmitted, the timer is a timer of the carrier or the serving cell indicated by the carrier index. For example, with cross-carrier scheduling in the carrier aggregation scenario, the carrier or the serving cell indicated by the carrier index is different from a carrier or a serving cell used for receiving the first message. The terminal device receives the first message on a carrier 1 or in a serving cell 1, and the carrier or the serving cell indicated by the carrier index of the first message is a carrier 2 or a serving cell 2. If the downlink BWP of the carrier or the serving cell indicated by the carrier index is not the default downlink BWP, the timer is the timer of the carrier or the serving cell indicated by the carrier index, namely, a timer of the carrier 2 or the serving cell 2.

Optionally, further, if the active downlink BWP of the terminal device is not the default downlink BWP and the active downlink BWP of the terminal device is a downlink BWP of the carrier or the serving cell used for receiving the first message, the timer is a timer of the carrier or the serving cell used for receiving the first message. For example, with cross-carrier scheduling in the carrier aggregation scenario, the carrier or the serving cell indicated by the carrier index is different from a carrier or a serving cell used for receiving the first message. The terminal device receives the first message on a carrier 1 or in a serving cell 1, and the carrier or the serving cell indicated by the carrier index of the first message is a carrier 2 or a serving cell 2. If the downlink BWP of the carrier or the serving cell indicated by the carrier index is not the default downlink BWP, the timer is the timer of the carrier or the serving cell indicated by the carrier index, namely, a timer of the carrier 2 or the serving cell 2. If the downlink BWP of the carrier or the serving cell used for receiving the first message is not the default downlink BWP, the timer is the timer of the carrier or the serving cell used for receiving the first message, namely, a timer of the carrier 1 or the serving cell 1. In other words, when the foregoing conditions are met, started or restarted timers include the timer of the carrier or the serving cell indicated by the carrier index and the timer of the carrier or the serving cell used for receiving the first message. This resolves a problem that the terminal device cannot correctly switch to the default downlink BWP and power consumption of the terminal device cannot be reduced, thereby reducing the power consumption of the terminal device.

In another scenario, namely, the unpaired spectrum scenario, if the active BWP pair of the terminal device is not the default BWP pair and the active BWP pair of the terminal device is a BWP pair of a carrier or a serving cell indicated by the carrier index, the timer is a timer of the carrier or the serving cell.

The timer is a timer used by the terminal device to switch from the active BWP pair to the default BWP pair, or the timer is a timer used by the terminal device to activate the default BWP pair and deactivate the active BWP pair. The following two possibilities may be included:

Possibility 1: When the first message indicates a downlink assignment or an uplink grant and does not indicate BWP switching, it may be considered that the active downlink BWP of the terminal device is a downlink BWP used for receiving the first message, and the timer is a timer associated with a BWP pair used by the terminal device for receiving the first message, or the timer is a timer associated with a BWP pair corresponding to the downlink BWP used by the terminal device for receiving the first message.

Possibility 2: When the first message indicates BWP switching and a BWP pair that is switched to is not the default BWP pair, it may be considered that the active BWP pair of the terminal device is the BWP pair that is switched to, and the timer is a timer associated with the BWP pair that the terminal device is switched to. For example, the terminal device has two timers, which are a timer 3 and a timer 4, and the timer 3 is associated with a BWP 3 pair and the timer 4 is associated with a BWP 4 pair. After the terminal device receives a first message used to indicate switching from the current active BWP 3 pair to the BWP 4 pair that is not the default BWP pair, the terminal device needs to switch from the current BWP 3 pair to the BWP 4 pair. When the terminal device determines to deactivate the active BWP 3 pair, the terminal device stops the timer associated with the to-be-deactivated BWP 3 pair, to be specific, when the terminal device determines to activate the BWP 4 pair and deactivate the BWP 3 pair, correspondingly, the terminal device needs to start or restart the timer 4 associated with the to-be-activated BWP 4 pair and stops the timer 3 associated with the to-be-deactivated BWP 3 pair. It should be noted that, in this embodiment of this application, the method may further include: When the terminal device determines to deactivate the active downlink BWP, the terminal device stops the timer associated with the to-be-deactivated downlink BWP; or when the terminal device determines to deactivate the active BWP pair, the terminal device stops the timer associated with the to-be-deactivated BWP pair. The terminal device determines, based on the first message, to deactivate the active BWP pair, and stops the timer associated with the to-be-deactivated BWP pair. In addition, when determining that the timer expires, the terminal device determines to deactivate the active BWP pair and stops the timer associated with the to-be-deactivated BWP pair.

In the unpaired spectrum scenario, if the first message indicates a downlink assignment or an uplink grant and does not indicate BWP switching, it may be considered that the active BWP pair of the terminal device is a BWP pair that is corresponding to a downlink BWP used for receiving the first message or a BWP pair to which a downlink BWP used for receiving the first message belongs; or if the first message indicates bandwidth part BWP switching, it may be considered that the active BWP pair of the terminal device is a BWP pair that is switched to. Alternatively, it may be considered that the active BWP pair of the terminal device is a BWP pair indicated by the first message, for example, an active BWP pair indicated in the downlink control information. Alternatively, it may be considered that the active BWP pair of the terminal device is a BWP pair that is corresponding to a downlink BWP indicated by the first message or a BWP pair to which a downlink BWP indicated by the first message belongs, for example, an active BWP pair that is corresponding to a downlink BWP indicated in the downlink control information or an active BWP pair to which a downlink BWP indicated in the downlink control information belongs.

In the unpaired spectrum scenario, if the active bandwidth part BWP pair of the terminal device is not the default BWP pair, and the active BWP pair of the terminal device is a BWP pair of a carrier or a serving cell indicated by the carrier index, or the active BWP pair of the terminal device is a BWP pair of a carrier or a serving cell with data transmitted, the timer is a timer of the carrier or the serving cell indicated by the carrier index. For example, with cross-carrier scheduling in the carrier aggregation scenario, the carrier or the serving cell indicated by the carrier index is different from a carrier or a serving cell used for receiving the first message. The terminal device receives the first message on a carrier 1 or in a serving cell 1, and the carrier or the serving cell indicated by the carrier index of the first message is a carrier 2 or a serving cell 2. If the BWP pair of the carrier or the serving cell indicated by the carrier index is not the default BWP pair, the timer is the timer of the carrier or the serving cell indicated by the carrier index, namely, a timer of the carrier 2 or the serving cell 2.

Optionally, further, if the active BWP pair of the terminal device is not the default BWP pair and the active BWP pair of the terminal device is a BWP pair of the carrier or the serving cell used for receiving the first message, the timer is a timer of the carrier or the serving cell used for receiving the first message. For example, with cross-carrier scheduling in the carrier aggregation scenario, the carrier or the serving cell indicated by the carrier index is different from a carrier or a serving cell used for receiving the first message. The terminal device receives the first message on a carrier 1 or in a serving cell 1, and the carrier or the serving cell indicated by the carrier index of the first message is a carrier 2 or a serving cell 2. If the BWP pair of the carrier or the serving cell indicated by the carrier index is not the default BWP pair, the timer is the timer of the carrier or the serving cell indicated by the carrier index, namely, a timer of the carrier 2 or the serving cell 2. If the BWP pair of the carrier or the serving cell used for receiving the first message is not the default BWP pair, the timer is the timer of the carrier or the serving cell used for receiving the first message, namely, a timer of the carrier 1 or the serving cell 1. In other words, when the foregoing conditions are met, started or restarted timers include the timer of the carrier or the serving cell indicated by the carrier index and the timer of the carrier or the serving cell used for receiving the first message. This resolves a problem that the terminal device cannot correctly switch to the default downlink BWP and power consumption of the terminal device cannot be reduced, thereby reducing the power consumption of the terminal device.

According to the timer processing method provided in this embodiment of the present invention, during determining of whether to start or restart a timer, the terminal device receives the first message sent by the network device. The terminal device starts or restarts the timer based on the carrier index of the first message, wherein the timer is a timer used by the terminal device to switch from the active downlink BWP to the default downlink BWP, or the timer is a timer used by the terminal device to activate the default downlink BWP and deactivate the active downlink BWP, or the timer is a timer used by the terminal device to switch from the active BWP pair to the default BWP pair, or the timer is a timer used by the terminal device to activate the default BWP pair and deactivate the active BWP pair. This resolves a problem that the terminal device cannot correctly switch to the default downlink BWP and power consumption of the terminal device cannot be reduced, thereby reducing the power consumption of the terminal device.

Figure 7:
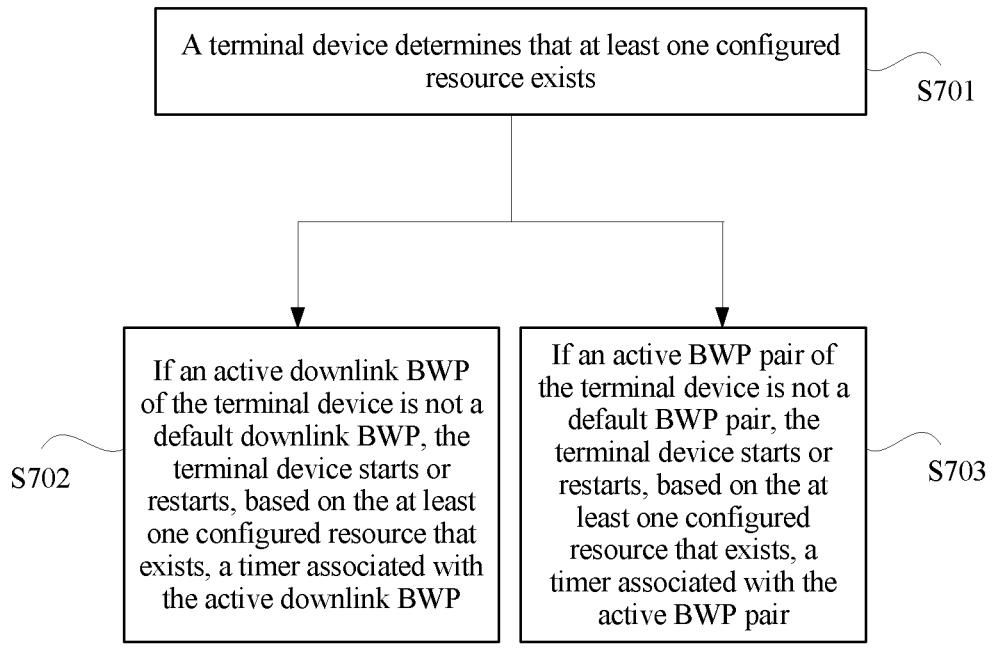
FIG. 7 is a schematic diagram of another timer processing method according to an embodiment of this application.

The embodiment shown in FIG. 6 describes in detail the solution about how the terminal device determines, based on the carrier index of the first message, whether to start or restart a timer. In addition, a timer is started or restarted only when a PDCCH is received in the prior art. Therefore, there is no timer restart condition in a non-dynamic scheduling process, and the terminal device may fall back to a default BWP in the non-dynamic scheduling process. Consequently, current data transmission of the terminal device is affected. Therefore, in an embodiment of the present invention, a description about how to start or restart a timer in the non-dynamic scheduling process is added. FIG. 7 is a schematic diagram of another timer processing method according to an embodiment of the present invention. The timer processing method may include the following steps.

S701: A terminal device determines that at least one configured resource exists.

It should also be noted that, in a paired spectrum scenario, an active downlink BWP of the terminal device is not a default downlink BWP. In an unpaired spectrum scenario, because an uplink BWP and a downlink BWP appear in pairs, that is, a pair of uplink and downlink BWPs are both switched during BWP switching, a default BWP may be considered as including a pair of uplink and downlink BWPs. In this case, an active BWP pair of the terminal device is not a default BWP pair.

It should be noted that, that at least one configured resource exists herein may be understood as the following: there is at least one configured resource, or at least one configured resource appears, or certainly, at least one configured resource occurs, or the like.

As there are different scenarios, methods for starting or restarting, by the terminal device, a timer based on the at least one configured resource that exists are different, and respectively correspond to S402 and S403.

S702: If an active downlink BWP of the terminal device is not a default downlink BWP, the terminal device starts or restarts, based on the at least one configured resource that exists, a timer associated with the active downlink BWP.

The timer is a timer used by the terminal device to switch from the active downlink BWP to the default downlink BWP, or the timer is a timer used by the terminal device to activate the default downlink BWP and deactivate the active downlink BWP.

It should be noted that, in the paired spectrum scenario in which a timer is associated with a BWP, if the active downlink BWP of the terminal device is not the default downlink BWP, when the terminal device starts or restarts the timer based on the scrambling identifier of the first message, the timer is the timer associated with the active downlink BWP of the terminal device. The following two possibilities may be included:

Possibility 1: When the first message indicates a downlink assignment and does not indicate BWP switching, it may be considered that the active downlink BWP of the terminal device is a downlink BWP used for receiving the first message, and the timer is a timer associated with the downlink BWP used by the terminal device for receiving the first message.

Possibility 2: When the first message indicates BWP switching and a downlink BWP that is switched to is not the default downlink BWP, it may be considered that the active downlink BWP of the terminal device is the downlink BWP that is switched to, and the timer is a timer associated with the downlink BWP that the terminal device is switched to. For example, the terminal device has two timers, which are a timer 1 and a timer 2, and the timer 1 is associated with a downlink BWP 1 and the timer 2 is associated with a downlink BWP 2. After the terminal device receives a first message used to indicate switching from the current active downlink BWP 1 to the downlink BWP 2 that is not the default downlink BWP, the terminal device needs to switch from the current downlink BWP 1 to the downlink BWP 2. When the terminal device determines to deactivate the active downlink BWP 1, the terminal device stops the timer associated with the to-be-deactivated downlink BWP 1, to be specific, when the terminal device determines to activate the downlink BWP 2 and deactivate the downlink BWP 1, correspondingly, the terminal device needs to start or restart the timer 2 associated with the to-be-activated downlink BWP 2 and stops the timer 1 associated with the to-be-deactivated downlink BWP 1. It should be noted that, in this embodiment of this application, the method may further include: When the terminal device determines to deactivate the active downlink BWP, the terminal device stops the timer associated with the to-be-deactivated downlink BWP; or when the terminal device determines to deactivate the active BWP pair, the terminal device stops the timer associated with the to-be-deactivated BWP pair. The terminal device determines, based on the first message, to deactivate the active downlink BWP, and stops the timer associated with the to-be-deactivated downlink BWP. In addition, when determining that the timer expires, the terminal device determines to deactivate the active downlink BWP and stops the timer associated with the to-be-deactivated downlink BWP.

In the solution shown in S702, in the paired spectrum scenario, if the active downlink BWP of the terminal device is not the default downlink BWP and the configured resource is a downlink resource, the terminal device may start or restart, based on the at least one configured resource that exists, the timer associated with the active downlink BWP.

Optionally, that the terminal device starts or restarts a timer based on the at least one configured resource that exists in S702 may include the following possible manners:

Manner 1: When the terminal device determines that the at least one configured resource exists, the terminal device starts or restarts the timer associated with the active downlink BWP.

In the manner 1, for example, with non-dynamic scheduling, for example, downlink semi-persistent scheduling (Semi-Persistent Scheduling, SPS), when the terminal device determines that at least one configured downlink resource exists, that is, at least one configured downlink assignment (downlink assignment) exists, the terminal device starts or restarts the timer, wherein the timer is a timer used by the terminal device to switch from the active downlink BWP to the default downlink BWP, or the timer is a timer used by the terminal device to activate the default downlink BWP and deactivate the active downlink BWP. This avoids a prior-art problem that the terminal device may fall back to a default BWP in a non-dynamic scheduling process because a timer is started or restarted only when a PDCCH is received, thereby avoiding impact on current data transmission of the terminal device. It should be noted that, the at least one configured resource is at least one configured resource on the active downlink BWP of the terminal device.

The manner 1 describes direct timer start or restart performed when at least one configured resource exists. Certainly, whether data is transmitted on the configured resource may further be determined, to determine whether to start or restart the timer, as described in a manner 2 below:

Manner 2: When determining that there is data transmitted on the configured resource, the terminal device starts or restarts the timer associated with the active downlink BWP.

In the manner 2, the terminal device does not start or restart the timer after determining that at least one configured resource exists. Instead, the terminal device further determines whether data is transmitted on the configured resource. For example, with non-dynamic scheduling, for example, downlink semi-persistent scheduling (Semi-Persistent Scheduling, SPS), when the terminal device determines that downlink data is transmitted on at least one configured downlink resource, that is, downlink data is transmitted on at least one configured downlink assignment (downlink assignment), the terminal device starts or restarts the timer, wherein the timer is a timer used by the terminal device to switch from the active downlink BWP to the default downlink BWP, or the timer is a timer used by the terminal device to activate the default downlink BWP and deactivate the active downlink BWP. This avoids a prior-art problem that the terminal device may fall back to a default BWP in a non-dynamic scheduling process because a timer is started or restarted only when a PDCCH is received, thereby avoiding impact on current data transmission of the terminal device. It should be noted that, the data transmission is data transmission on the active downlink BWP of the terminal device.

S703: If an active BWP pair of the terminal device is not a default BWP pair, the terminal device starts or restarts a timer based on the at least one configured resource that exists.

The timer is a timer used by the terminal device to switch from the active BWP pair to the default BWP pair, or the timer is a timer used by the terminal device to activate the default BWP pair and deactivate the active BWP pair.

It should be noted that, in the unpaired spectrum scenario in which a timer is associated with a BWP, if the active BWP pair of the terminal device is not the default BWP pair, when the terminal device starts or restarts the timer based on the scrambling identifier of the first message, the timer is the timer associated with the active BWP pair of the terminal device. The following two possibilities may be included:

Possibility 1: When the first message indicates a downlink assignment or an uplink grant and does not indicate BWP switching, it may be considered that the active downlink BWP of the terminal device is a downlink BWP used for receiving the first message, and the timer is a timer associated with a BWP pair used by the terminal device for receiving the first message, or the timer is a timer associated with a BWP pair corresponding to the downlink BWP used by the terminal device for receiving the first message.

Possibility 2: When the first message indicates BWP switching and a BWP pair that is switched to is not the default BWP pair, it may be considered that the active BWP pair of the terminal device is the BWP pair that is switched to, and the timer is a timer associated with the BWP pair that the terminal device is switched to. For example, the terminal device has two timers, which are a timer 3 and a timer 4, and the timer 3 is associated with a BWP 3 pair and the timer 4 is associated with a BWP 4 pair. After the terminal device receives a first message used to indicate switching from the current active BWP 3 pair to the BWP 4 pair that is not the default BWP pair, the terminal device needs to switch from the current BWP 3 pair to the BWP 4 pair. When the terminal device determines to deactivate the active BWP 3 pair, the terminal device stops the timer associated with the to-be-deactivated BWP 3 pair, to be specific, when the terminal device determines to activate the BWP 4 pair and deactivate the BWP 3 pair, correspondingly, the terminal device needs to start or restart the timer 4 associated with the to-be-activated BWP 4 pair and stops the timer 3 associated with the to-be-deactivated BWP 3 pair. It should be noted that, in this embodiment of this application, the method may further include: When the terminal device determines to deactivate the active downlink BWP, the terminal device stops the timer associated with the to-be-deactivated downlink BWP; or when the terminal device determines to deactivate the active BWP pair, the terminal device stops the timer associated with the to-be-deactivated BWP pair. The terminal device determines, based on the first message, to deactivate the active BWP pair, and stops the timer associated with the to-be-deactivated BWP pair. In addition, when determining that the timer expires, the terminal device determines to deactivate the active BWP pair and stops the timer associated with the to-be-deactivated BWP pair.

In the solution shown in S703, in the unpaired spectrum scenario, if the active BWP pair of the terminal device is not the default BWP pair and the configured resource is a downlink resource or an uplink resource, the terminal device may start or restart, based on the at least one configured resource that exists, the timer associated with the active BWP pair.

Optionally, that the terminal device starts or restarts, based on the at least one configured resource that exists, a timer associated with the active BWP pair in S703 may include the following possible manners:

Manner 1: When the terminal device determines that the at least one configured resource exists, the terminal device starts or restarts the timer associated with the active BWP pair.

In the manner 1, for example, with non-dynamic scheduling, for example, downlink semi-persistent scheduling (Semi-Persistent Scheduling, SPS), grant free (Grant Free, GF) scheduling, or uplink semi-persistent scheduling, wherein the grant free (Grant Free, GF) scheduling is also referred to as a configured grant type 1 (configured grant Type 1) and the uplink semi-persistent scheduling is also referred to as a configured grant type 2 (configured grant Type 2), when the terminal device determines that at least one configured downlink resource or configured uplink resource exists, that is, at least one configured downlink assignment (downlink assignment) exists or at least one configured uplink grant (uplink grant) exists, the terminal device starts or restarts the timer, wherein the timer is a timer used by the terminal device to switch from the active downlink BWP to the default downlink BWP, or the timer is a timer used by the terminal device to activate the default BWP pair and deactivate the active BWP pair. This avoids a prior-art problem that the terminal device may fall back to a default BWP in a non-dynamic scheduling process because a timer is started or restarted only when a PDCCH is received, thereby avoiding impact on current data transmission of the terminal device. It should be noted that, the at least one configured resource is at least one configured resource on the active BWP pair of the terminal device.

The manner 1 describes direct timer start or restart performed when at least one configured resource exists. Certainly, whether data is transmitted on the configured resource may further be determined, to determine whether to start or restart the timer, as described in a manner 2 below:

Manner 2: When determining that there is date transmitted on the configured resource, the terminal device starts or restarts the timer associated with the active BWP pair.

In the manner 2, the terminal device does not start or restart the timer after determining that at least one configured resource exists. Instead, the terminal device further determines whether data is transmitted on the configured resource. For example, with non-dynamic scheduling, for example, downlink semi-persistent scheduling (Semi-Persistent Scheduling, SPS), grant free (Grant Free, GF) scheduling, or uplink semi-persistent scheduling, wherein the grant free (Grant Free, GF) scheduling is also referred to as a configured grant type 1 (configured grant Type 1) and the uplink semi-persistent scheduling is also referred to as a configured grant type 2 (configured grant Type 2), when the terminal device determines that downlink data is transmitted on at least one configured downlink resource, that is, downlink data is transmitted on at least one configured downlink assignment (downlink assignment), the terminal device starts or restarts the timer; or when the terminal device determines that uplink data is transmitted on at least one configured uplink resource, that is, uplink data is transmitted on at least one configured uplink grant (uplink grant), the terminal device starts or restarts the timer, wherein the timer is a timer used by the terminal device to switch from the active BWP pair to the default BWP pair, or the timer is a timer used by the terminal device to activate the default downlink BWP and deactivate the active downlink BWP. This avoids a prior-art problem that the terminal device may fall back to a default BWP in a non-dynamic scheduling process because a timer is started or restarted only when a PDCCH is received, thereby avoiding impact on current data transmission of the terminal device. It should be noted that, the data transmission is data transmission on the active BWP pair of the terminal device.

It should be noted that, in one scheduling process, only either S702 or S703 is executed after S701 is executed, in other words, S702 and S703 are not synchronously executed.

According to the timer processing method provided in this embodiment of the present invention, during determining of whether to start or restart a timer, the terminal device determines that at least one configured resource exists or determines that data is transmitted on the at least one configured resource. If the active downlink BWP of the terminal device is not the default downlink BWP, the terminal device starts or restarts the timer based on the at least one configured resource that exists or the terminal device starts or restarts the timer based on a fact that data is transmitted on the at least one configured resource, wherein the timer is a timer used by the terminal device to switch from the active downlink BWP to the default downlink BWP, or the timer is a timer used by the terminal device to activate the default downlink BWP and deactivate the active downlink BWP; if the active BWP pair of the terminal device is not the default BWP pair, the terminal device starts or restarts the timer based on the at least one configured resource that exists or the terminal device starts or restarts the timer based on a fact that data is transmitted on the at least one configured resource, wherein the timer is a timer used by the terminal device to switch from the active BWP pair to the default BWP pair, or the timer is a timer used by the terminal device to activate the default BWP pair and deactivate the active BWP pair. This resolves a problem that the terminal device falls back to a default BWP in a non-dynamic scheduling process, thereby avoiding impact on current data transmission of the terminal device.

It should be noted that, the timer in the embodiments shown in FIG. 5 to FIG. 7 may further be another type of timer. The another type of timer may be a timer used by the terminal device to deactivate the active downlink BWP, or the another type of timer may be used by the terminal device to deactivate the active BWP pair of the terminal device. In addition, it should be noted that, the downlink BWP in the paired spectrum scenario may represent a downlink BWP in a BWP pair, and may also represent an uplink BWP paired with the downlink BWP, in other words, the downlink BWP may be understood as a BWP pair corresponding to the downlink BWP.

An embodiment of the present invention provides another timer processing method. The method is specifically as follows.

A terminal device receives an instruction message sent by a network device, wherein the instruction message instructs the terminal device to activate at least one secondary serving cell.

The terminal device starts or restarts a timer associated with the secondary serving cell.

In a paired spectrum scenario, the timer is a timer used by the terminal device to switch from an active downlink bandwidth part BWP to a default downlink BWP, or the timer is a timer used by the terminal device to activate a default downlink BWP and deactivate an active downlink BWP. In an unpaired spectrum scenario, the timer is a timer used by the terminal device to switch from an active BWP pair to a default BWP pair, or the timer is a timer used by the terminal device to activate a default BWP pair and deactivate an active BWP pair.

Optionally, the secondary serving cell is in an inactive state.

Optionally, before the terminal device receives the instruction message sent by the network device, the method further includes:

The terminal device receives a radio resource control RRC message sent by the network device, wherein the RRC message includes instruction information, and the instruction information instructs to add or modify the at least one secondary serving cell. In the paired spectrum scenario, the RRC message further includes a first downlink BWP of the secondary serving cell, the first downlink BWP is a downlink BWP that is first activated when the secondary serving cell is activated, and the first downlink BWP is not a default downlink BWP. In the unpaired spectrum scenario, the RRC message further includes a first BWP pair of the secondary serving cell, the first BWP pair is a BWP pair that is first activated when the secondary serving cell is activated, and the first BWP pair is not a default downlink BWP pair.

In the paired spectrum scenario, the timer is a timer associated with the first downlink BWP, or the timer is a timer associated with a current active downlink BWP, and the current active downlink BWP may be the first downlink BWP. That the terminal device starts or restarts a timer associated with the secondary serving cell may be understood as that the terminal device starts or restarts the timer associated with the first downlink BWP associated with the secondary serving cell. In the unpaired spectrum scenario, the timer is a timer associated with the first BWP pair, or the timer is a timer associated with a current active BWP pair, and the current active BWP pair may be a first downlink BWP. That the terminal device starts or restarts a timer associated with the secondary serving cell may be understood as that the terminal device starts or restarts the timer associated with the first BWP pair associated with the secondary serving cell.

An embodiment of the present invention provides another timer processing method. The method is specifically as follows.

A terminal device receives an instruction message sent by a network device, wherein the instruction message instructs the terminal device to deactivate at least one secondary serving cell, and a timer associated with the secondary serving cell is in a running state.

In a paired spectrum scenario, the timer is a timer used by the terminal device to switch from an active downlink bandwidth part BWP to a default downlink BWP, or the timer is a timer used by the terminal device to activate a default downlink BWP and deactivate an active downlink BWP. In an unpaired spectrum scenario, the timer is a timer used by the terminal device to switch from an active BWP pair to a default BWP pair, or the timer is a timer used by the terminal device to activate a default BWP pair and deactivate an active BWP pair.

The terminal device stops or resets the timer associated with the secondary serving cell, or the terminal device stops and resets the timer associated with the secondary serving cell.

In the paired spectrum scenario, the timer is a timer associated with the active downlink BWP of the terminal device, or the timer is a timer associated with an active downlink BWP of the terminal device in the secondary serving cell. That the terminal device stops or resets the timer associated with the secondary serving cell may be understood as that the terminal device stops or resets the timer associated with the active downlink BWP of the secondary serving cell, or that the terminal device stops or resets the timer associated with the secondary serving cell may be understood as that the terminal device stops or resets a timer associated with any one or all of active downlink BWPs of the secondary serving cell. In the unpaired spectrum scenario, the timer is a timer associated with the active BWP pair of the terminal device, or the timer is a timer associated with an active BWP pair of the terminal device in the secondary serving cell. That the terminal device stops or resets the timer associated with the secondary serving cell may be understood as that the terminal device stops or resets the timer associated with the active BWP pair of the secondary serving cell, or that the terminal device stops or resets the timer associated with the secondary serving cell may be understood as that the terminal device stops or resets a timer associated with any one or all of active BWP pairs of the secondary serving cell.

An embodiment of the present invention provides another timer processing method. The method is specifically as follows.

A terminal device determines that a secondary serving cell deactivation timer of a secondary serving cell expires, wherein a timer associated with the secondary serving cell is in a running state.

In a paired spectrum scenario, the timer is a timer used by the terminal device to switch from an active downlink bandwidth part BWP to a default downlink BWP, or the timer is a timer used by the terminal device to activate a default downlink BWP and deactivate an active downlink BWP. In an unpaired spectrum scenario, the timer is a timer used by the terminal device to switch from an active BWP pair to a default BWP pair, or the timer is a timer used by the terminal device to activate a default BWP pair and deactivate an active BWP pair.

The terminal device stops or resets the timer associated with the secondary serving cell, or the terminal device stops and resets the timer associated with the secondary serving cell.

In the paired spectrum scenario, the timer is a timer associated with the active downlink BWP of the terminal device, or the timer is a timer associated with an active downlink BWP of the terminal device in the secondary serving cell. That the terminal device stops or resets the timer associated with the secondary serving cell may be understood as that the terminal device stops or resets the timer associated with the active downlink BWP of the secondary serving cell, or that the terminal device stops or resets the timer associated with the secondary serving cell may be understood as that the terminal device stops or resets a timer associated with any one or all of active downlink BWPs of the secondary serving cell. In the unpaired spectrum scenario, the timer is a timer associated with the active BWP pair of the terminal device, or the timer is a timer associated with an active BWP pair of the terminal device in the secondary serving cell. That the terminal device stops or resets the timer associated with the secondary serving cell may be understood as that the terminal device stops or resets the timer associated with the active BWP pair of the secondary serving cell, or that the terminal device stops or resets the timer associated with the secondary serving cell may be understood as that the terminal device stops or resets a timer associated with any one or all of active BWP pairs of the secondary serving cell.

Figure 8:
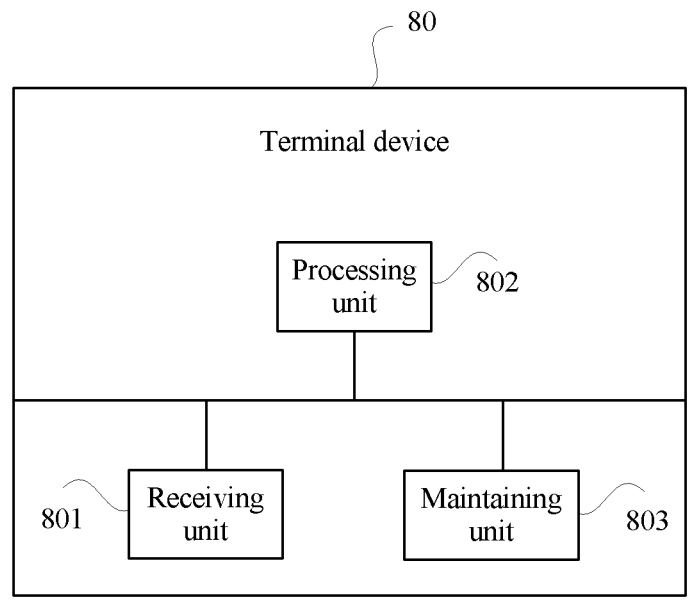
FIG. 8 is a schematic structural diagram of a terminal device according to an embodiment of this application.

FIG. 8 is a schematic structural diagram of a terminal device 80 according to an embodiment of this application. As shown in FIG. 8, the terminal device 80 may include a receiving unit 801 and a processing unit 802.

The receiving unit 801 is configured to receive a first message sent by a network device, wherein the first message is used to indicate a downlink assignment or an uplink grant, or the first message is used to indicate bandwidth part BWP switching.

The processing unit 802 is configured to: if an active downlink bandwidth part BWP of the terminal device 80 is not a default downlink BWP, start or restart a timer based on a scrambling identifier of the first message, wherein the timer is a timer used by the terminal device 80 to switch from the active downlink BWP to the default downlink BWP, or the timer is a timer used by the terminal device 80 to activate the default downlink BWP and deactivate the active downlink BWP.

The processing unit 802 is further configured to: if an active BWP pair of the terminal device 80 is not a default BWP pair, start or restart a timer based on a scrambling identifier of the first message, wherein the timer is a timer used by the terminal device 80 to switch from the active BWP pair to the default BWP pair, or the timer is a timer used by the terminal device 80 to activate the default BWP pair and deactivate the active BWP pair.

Optionally, the processing unit 802 is specifically configured to start or restart the timer when the scrambling identifier is not a random access radio network temporary identifier RA-RNTI or a temporary cell radio network temporary identifier TC-RNTI.

Optionally, the processing unit 802 is specifically configured to start or restart the timer when the scrambling identifier is a first scrambling identifier, wherein the first scrambling identifier is any one or a combination of a cell radio network temporary identifier C-RNTI, a configured scheduling radio network temporary identifier CS-RNTI, a paging radio network temporary identifier P-RNTI, and a system information radio network temporary identifier SI-RNTI.

Optionally, the processing unit 802 is specifically configured to start or restart the timer when the scrambling identifier is a random access radio network temporary identifier RA-RNTI and the terminal device 80 executes non-contention-based random access.

Optionally, the terminal device 80 may further include:

a maintaining unit 803, configured to, when the scrambling identifier is an RA-RNTI and the terminal device executes contention-based random access, control the timer to maintain an original state.

Optionally, the timer is a timer associated with the active downlink BWP of the terminal device 80, or the timer is a timer associated with the active BWP pair of the terminal device 80.

The terminal device 80 shown in this embodiment of this application may execute the technical solution of the timer processing method in the embodiment shown in FIG. 2 or FIG. 5. Implementation principles and technical effects thereof are similar, and details are not described herein again.

Figure 9:
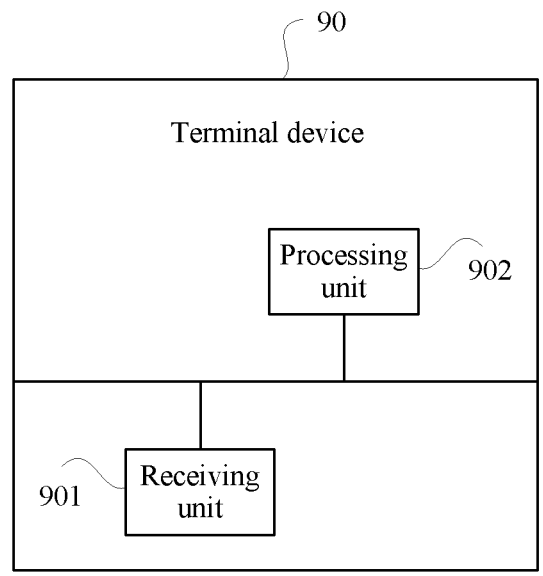
FIG. 9 is a schematic structural diagram of another terminal device according to an embodiment of this application.

FIG. 9 is a schematic structural diagram of another terminal device 90 according to an embodiment of this application. As shown in FIG. 9, the terminal device 90 may include a receiving unit 901 and a processing unit 902.

The receiving unit 901 is configured to receive a first message sent by a network device, wherein the first message is used to indicate a downlink assignment or an uplink grant, or the first message is used to indicate bandwidth part BWP switching.

The processing unit 902 is configured to start or restart a timer based on a carrier index of the first message, wherein the timer is a timer used by the terminal device 90 to switch from an active downlink BWP to a default downlink BWP, or the timer is a timer used by the terminal device 90 to activate a default downlink BWP and deactivate an active downlink BWP, or the timer is a timer used by the terminal device 90 to switch from an active BWP pair to a default BWP pair, or the timer is a timer used by the terminal device 90 to activate a default BWP pair and deactivate an active BWP pair.

Optionally, if the active downlink BWP of the terminal device 90 is not the default downlink BWP and the active downlink BWP of the terminal device 90 is a downlink BWP of a carrier or a serving cell indicated by the carrier index, or if the active BWP pair of the terminal device 90 is not the default BWP pair and the active BWP pair of the terminal device 90 is a BWP pair of a carrier or a serving cell indicated by the carrier index, the timer is a timer of the carrier or the serving cell.

Optionally, if the active downlink BWP of the terminal device 90 is not the default downlink BWP and the active downlink BWP of the terminal device 90 is a downlink BWP of a carrier or a serving cell used for receiving the first message, or if the active BWP pair of the terminal device 90 is not the default BWP pair and the active BWP pair of the terminal device 90 is a BWP pair of a carrier or a serving cell used for receiving the first message, the timer is a timer of the carrier or the serving cell used for receiving the first message.

Optionally, the timer is a timer associated with the active downlink BWP of the terminal device 90, or the timer is a timer associated with an active downlink BWP of the terminal device 90 on the carrier or in the serving cell, or the timer is a timer associated with the active BWP pair of the terminal device 90, or the timer is a timer associated with an active BWP pair of the terminal device 90 on the carrier or in the serving cell.

The terminal device 90 shown in this embodiment of this application may execute the technical solution of the timer processing method in the embodiment shown in FIG. 3 or FIG. 6. Implementation principles and technical effects thereof are similar, and details are not described herein again.

Figure 10:
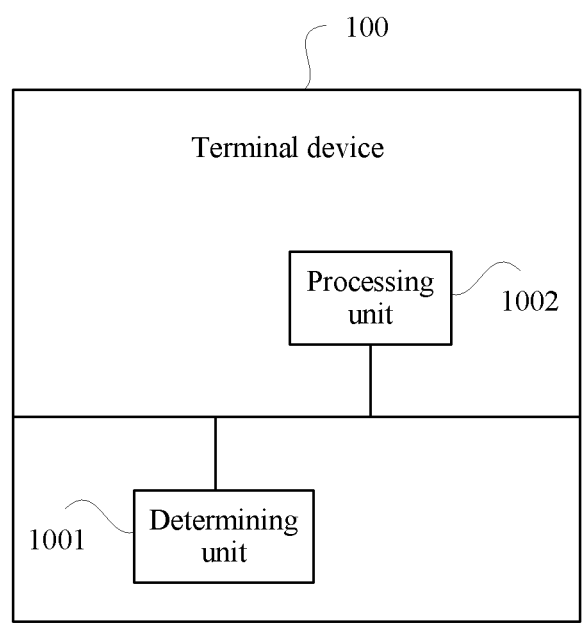
FIG. 10 is a schematic structural diagram of another terminal device according to an embodiment of this application.

FIG. 10 is a schematic structural diagram of another terminal device 100 according to an embodiment of this application. As shown in FIG. 10, the terminal device 100 may include a determining unit 1001 and a processing unit 1002.

The determining unit 1001 is configured to determine that at least one configured resource exists.

The processing unit 1002 is configured to: if an active bandwidth part BWP pair of the terminal device 100 is not a default BWP pair, start or restart a timer based on the at least one configured resource that exists, wherein the timer is a timer used by the terminal device 100 to switch from the active BWP pair to the default BWP pair, or the timer is a timer used by the terminal device 100 to activate the default BWP pair and deactivate the active BWP pair.

Optionally, data is transmitted on the configured resource.

Optionally, the configured resource is a downlink resource or an uplink resource.

The processing unit 1002 is specifically configured to: start or restart the timer when the at least one configured resource exists; or start or restart the timer when the configured resource is a downlink resource and downlink data is transmitted on the downlink resource; or start or restart the timer when the configured resource is an uplink resource and uplink data is transmitted on the uplink resource.

Optionally, the timer is a timer associated with the active BWP pair of the terminal device 100.

The terminal device 100 shown in this embodiment of this application may execute the technical solution of the timer processing method in the embodiment shown in FIG. 4 or FIG. 7. Implementation principles and technical effects thereof are similar, and details are not described herein again.

Figure 11:
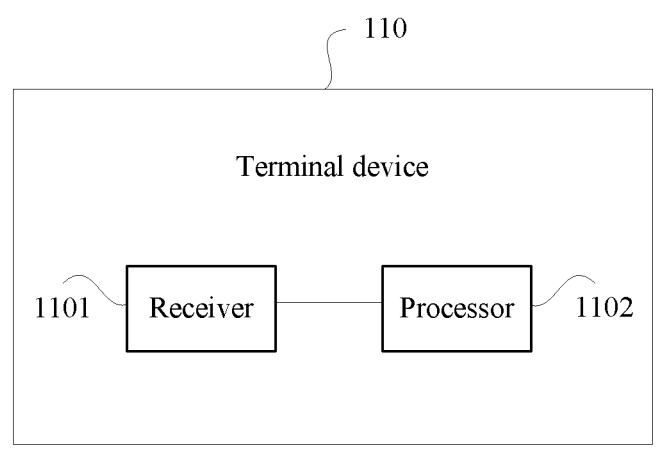
FIG. 11 is a schematic structural diagram of a terminal device according to an embodiment of this application.

FIG. 11 is a schematic structural diagram of a terminal device 110 according to an embodiment of this application. As shown in FIG. 11, the terminal device 110 may include a receiver 1101 and a processor 1102.

The receiver 1101 is configured to receive a first message sent by a network device, wherein the first message is used to indicate a downlink assignment or an uplink grant, or the first message is used to indicate bandwidth part BWP switching.

The processor 1102 is configured to: if an active downlink BWP of the terminal device 110 is not a default downlink BWP, start or restart a timer based on a scrambling identifier of the first message, wherein the timer is a timer used by the terminal device 110 to switch from the active downlink BWP to the default downlink BWP, or the timer is a timer used by the terminal device 110 to activate the default downlink BWP and deactivate the active downlink BWP; or the processor 1102 is configured to: if an active BWP pair of the terminal device 110 is not a default BWP pair, start or restart a timer based on a scrambling identifier of the first message, wherein the timer is a timer used by the terminal device 110 to switch from the active BWP pair to the default BWP pair, or the timer is a timer used by the terminal device 110 to activate the default BWP pair and deactivate the active BWP pair.

Optionally, the processor 1102 is specifically configured to start or restart the timer when the scrambling identifier is not a random access radio network temporary identifier RA-RNTI or a temporary cell radio network temporary identifier TC-RNTI.

Optionally, the processor 1102 is specifically configured to start or restart the timer when the scrambling identifier is a first scrambling identifier, wherein the first scrambling identifier is any one or a combination of a cell radio network temporary identifier C-RNTI, a configured scheduling radio network temporary identifier CS-RNTI, a paging radio network temporary identifier P-RNTI, and a system information radio network temporary identifier SI-RNTI.

Optionally, the processor 1102 is specifically configured to start or restart the timer when the scrambling identifier is a random access radio network temporary identifier RA-RNTI and the terminal device 110 executes non-contention-based random access.

Optionally, the processor 1102 is further configured to, when the scrambling identifier is an RA-RNTI and the terminal device executes contention-based random access, control the timer to maintain an original state.

Optionally, the timer is a timer associated with the active downlink BWP of the terminal device 110, or the timer is a timer associated with the active BWP pair of the terminal device 110.

The terminal device 110 shown in this embodiment of this application may execute the technical solution of the timer processing method in the embodiment shown in FIG. 2 or FIG. 5. Implementation principles and technical effects thereof are similar, and details are not described herein again.

Figure 12:
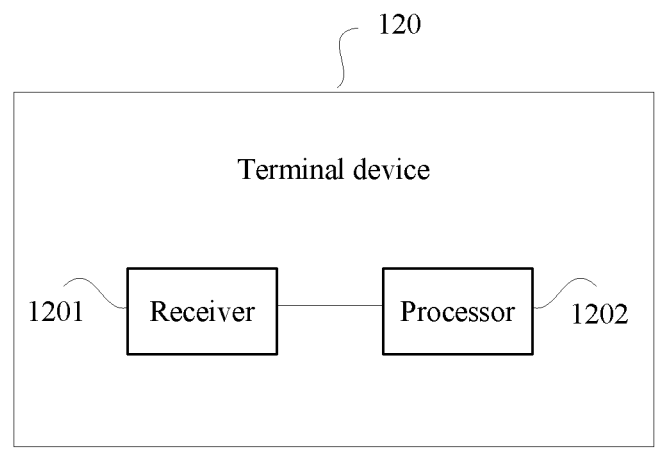
FIG. 12 is a schematic structural diagram of another terminal device according to an embodiment of the present invention.

FIG. 12 is a schematic structural diagram of another terminal device 120 according to an embodiment of the present invention. As shown in FIG. 12, the terminal device 120 may include a receiver 1201 and a processor 1202.

The receiver 1201 is configured to receive a first message sent by a network device, wherein the first message is used to indicate a downlink assignment or an uplink grant, or the first message is used to indicate bandwidth part BWP switching.

The processor 1202 is configured to start or restart a timer based on a carrier index of the first message, wherein the timer is a timer used by the terminal device 120 to switch from an active downlink BWP to a default downlink BWP, or the timer is a timer used by the terminal device 120 to activate a default downlink BWP and deactivate an active downlink BWP, or the timer is a timer used by the terminal device 120 to switch from an active BWP pair to a default BWP pair, or the timer is a timer used by the terminal device 120 to activate a default BWP pair and deactivate an active BWP pair.

Optionally, if the active downlink BWP of the terminal device 120 is not the default downlink BWP and the active downlink BWP of the terminal device 120 is a downlink BWP of a carrier or a serving cell indicated by the carrier index, or if the active BWP pair of the terminal device 120 is not the default BWP pair and the active BWP pair of the terminal device 120 is a BWP pair of a carrier or a serving cell indicated by the carrier index, the timer is a timer of the carrier or the serving cell.

Optionally, if the active downlink BWP of the terminal device 120 is not the default downlink BWP and the active downlink BWP of the terminal device 120 is a downlink BWP of a carrier or a serving cell used for receiving the first message, or if the active BWP pair of the terminal device 120 is not the default BWP pair and the active BWP pair of the terminal device 120 is a BWP pair of a carrier or a serving cell used for receiving the first message, the timer is a timer of the carrier or the serving cell used for receiving the first message.

Optionally, the timer is a timer associated with the active downlink BWP of the terminal device 120, or the timer is a timer associated with an active downlink BWP of the terminal device 120 on the carrier or in the serving cell, or the timer is a timer associated with the active BWP pair of the terminal device 120, or the timer is a timer associated with an active BWP pair of the terminal device 120 on the carrier or in the serving cell.

The terminal device 120 shown in this embodiment of this application may execute the technical solution of the timer processing method in the embodiment shown in FIG. 3 or FIG. 6. Implementation principles and technical effects thereof are similar, and details are not described herein again.

Figure 13:
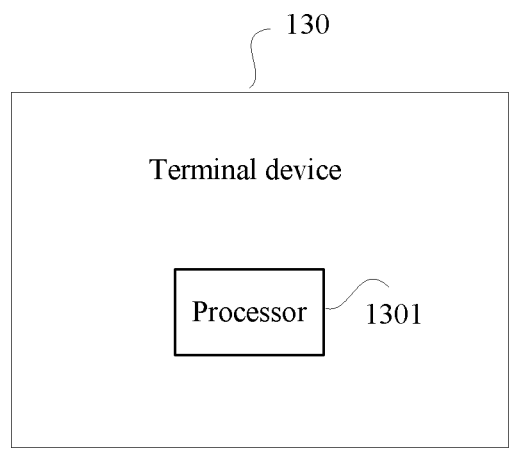
FIG. 13 is a schematic structural diagram of another terminal device according to an embodiment of this application.

FIG. 13 is a schematic structural diagram of another terminal device 130 according to an embodiment of this application. As shown in FIG. 13, the terminal device 130 may include a processor 1301.

The processor 1301 is configured to determine that at least one configured resource exists.

The processor 1301 is configured to: if an active bandwidth part BWP pair of the terminal device 130 is not a default BWP pair, start or restart a timer based on the at least one configured resource that exists, wherein the timer is a timer used by the terminal device 130 to switch from the active BWP pair to the default BWP pair, or the timer is a timer used by the terminal device 130 to activate the default BWP pair and deactivate the active BWP pair.

Optionally, data is transmitted on the configured resource.

Optionally, the configured resource is a downlink resource or an uplink resource.

The processor 1301 is specifically configured to: start or restart the timer when determining that the at least one configured resource exists; or start or restart the timer when the configured resource is a downlink resource and downlink data is transmitted on the downlink resource; or start or restart the timer when the configured resource is an uplink resource and uplink data is transmitted on the uplink resource.

Optionally, the timer is a timer associated with the active BWP pair of the terminal device 130.

The terminal device 130 shown in this embodiment of this application may execute the technical solution of the timer processing method in the embodiment shown in FIG. 4 or FIG. 7. Implementation principles and technical effects thereof are similar, and details are not described herein again.

Figure 14:
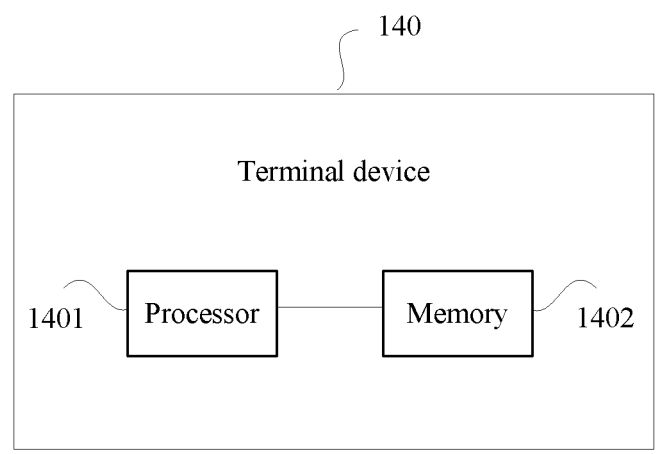
FIG. 14 is a schematic structural diagram of another terminal device according to an embodiment of this application.

FIG. 14 is a schematic structural diagram of another terminal device 140 according to an embodiment of this application. As shown in FIG. 14, the terminal device 140 may include a processor 1401 and a memory 1402.

The memory 1402 is configured to store a program instruction.

The processor 1401 is configured to invoke and execute the program instruction stored in the memory 1402, to execute the timer processing method shown in any one of the foregoing embodiments.

The terminal device 140 shown in this embodiment of this application may execute the technical solution of the timer processing method in any embodiment shown in FIG. 2 to FIG. 4. Implementation principles and technical effects thereof are similar, and details are not described herein again.

It should be understood that, the processor shown in FIG. 11 to FIG. 14 may be a central processing unit (Central Processing Unit, CPU), and may also be another general-purpose processor, a digital signal processor (Digital Signal Processor, DSP), an application-specific integrated circuit (Application Specific Integrated Circuit, ASIC), or the like. The general-purpose processor may be a microprocessor or the processor may be any conventional processor, or the like. The steps of the methods disclosed with reference to this application may be directly implemented by a hardware processor, or may be implemented by a combination of hardware and a software module in a processor.

All or some of the steps in the foregoing method embodiments may be implemented by a program instructing related hardware. The foregoing program may be stored in a computer-readable memory. When the program is executed, the steps of the method embodiments are performed. The foregoing memory (storage medium) includes: a read-only memory (read-only memory, ROM), a RAM, a flash memory, a hard disk, a solid state disk, a magnetic tape (magnetic tape), a floppy disk (floppy disk), an optical disc (optical disc), and any combination thereof.

An embodiment of this application further provides a computer-readable storage medium. The computer-readable storage medium stores a computer program, and when executed by a processor, the computer program executes the timer processing method shown in any one of the foregoing embodiments.

The computer-readable storage medium shown in this embodiment of this application may execute the technical solution of the timer processing method in any embodiment shown in FIG. 2 to FIG. 4. Implementation principles and technical effects thereof are similar, and details are not described herein again.

An embodiment of this application further provides a chip. The chip stores a computer program, and when executed by a processor, the computer program executes the timer processing method shown in any one of the foregoing embodiments.

The chip shown in this embodiment of this application may execute the technical solution of the timer processing method in any embodiment shown in FIG. 2 to FIG. 4. Implementation principles and technical effects thereof are similar, and details are not described herein again.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state Disk, SSD)), or the like.

A person skilled in the art should be aware that in the foregoing one or more examples, functions described in the embodiments of this application may be implemented by hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, wherein the communications medium includes any medium that enables a computer program to be transmitted from one place to another. The storage medium may be any available medium accessible to a general-purpose or dedicated computer.

What is claimed is:

1. A timer processing method, performed by a terminal device, the timer processing method comprising:
receiving a first message from a network device, wherein the first message indicates a downlink assignment or an uplink grant and is scrambled using a first scrambling identifier;
in response to the first message being scrambled by using the first scrambling identifier and an active downlink bandwidth part (BWP) of the terminal device not being a default downlink BWP, starting or restarting a timer used by the terminal device to switch from the active downlink BWP to the default downlink BWP wherein the first scrambling identifier is a cell radio network temporary identifier (C-RNTI) or a configured scheduling radio network temporary identifier (CS-RNTI);

wherein the receiving the first message from the network device, comprises:

receiving the first message on a first carrier or a first serving cell, the first message includes a carrier index, wherein the carrier index indicates a second carrier or a second serving cell;

wherein the starting or restarting the timer comprises:

starting or restarting a timer associated with the second carrier or the second serving cell, wherein the active downlink BWP of the terminal device comprises a downlink BWP of the second carrier or the second serving cell.

2. The method according to claim 1, wherein the method further comprises:

initiating a random access procedure; and
stopping the timer upon initiation of the random access procedure.

3. The method according to claim 2, wherein during the random access procedure, the timer is in a not-running state.

4. The method according to claim 1, wherein the starting or restarting the timer, further comprises:

starting or restarting a timer associated with the first carrier or the first serving cell, wherein the active downlink BWP of the terminal device further comprises a downlink BWP of the first carrier or the first serving cell.

5. The method according to claim 1, wherein the second carrier is different from the first carrier, or the second serving cell is different from the first serving cell.

6. The method according to claim 4, wherein the timer associated with the first carrier or the first serving cell is associated with the active downlink BWP of the terminal device; or the timer associated with the second carrier or the second serving cell is associated with the active downlink BWP of the terminal device.

7. The method according to claim 1, wherein the default downlink BWP is configured by the network device; or in a case that a default downlink BWP is not configured for the terminal device, the default downlink BWP is an initial downlink BWP.

8. The method according to claim 1, wherein the first message is carried on a physical downlink control channel (PDCCH).

9. A terminal device, comprising a processor and a memory, wherein the memory stores one or more instructions or programs, the processor is coupled to the memory, and when the processor runs the one or more instructions or programs the terminal device is configured to execute the following steps:

receiving a first message from a network device, wherein the first message indicates a downlink assignment or an uplink grant and is scrambled using a first scrambling identifier;

in response to the first message being scrambled by using the first scrambling identifier and an active downlink bandwidth part (BWP) of the terminal device not being a default downlink BWP, starting or restarting a timer used by the terminal device to switch from the active downlink BWP to the default downlink BWP wherein the first scrambling identifier is a cell radio network temporary identifier (C-RNTI) or a configured scheduling radio network temporary identifier (CS-RNTI);

wherein the receiving the first message from the network device, comprises:

receiving the first message on a first carrier or a first serving cell, the first message includes a carrier index, wherein the carrier index indicates a second carrier or a second serving cell;

wherein the starting or restarting the timer comprises:

starting or restarting a timer associated with the second carrier or the second serving cell, wherein the active downlink BWP of the terminal device comprises a downlink BWP of the second carrier or the second serving cell.

10. The terminal device according to claim 9, wherein the processor runs the one or more instructions or programs, so that the terminal device further executes the following steps:

initiating a random access procedure; and
stopping the timer upon initiation of the random access procedure.

11. The terminal device according to claim 9, wherein the starting or restarting the timer, further comprises:

starting or restarting a timer associated with the first carrier or the first serving cell, wherein the active downlink BWP of the terminal device further comprises a downlink BWP of the first carrier or the first serving cell.

12. The terminal device according to claim 11, wherein the timer associated with the first carrier or the first serving cell is associated with the active downlink BWP of the terminal device; or the timer associated with the second carrier or the second serving cell is associated with the active downlink BWP of the terminal device.

13. The terminal device according to claim 9, wherein the second carrier is different from the first carrier, or the second serving cell is different from the first serving cell.

14. A non-transitory computer-readable storage medium, wherein the non-transitory computer-readable storage medium stores a computer program, and when executed by a terminal device, the terminal device executes the method according the following steps:

receiving a first message from a network device, wherein the first message indicates a downlink assignment or an uplink grant and is scrambled by using a first scrambling identifier;

in response to the first message being scrambled by using the first scrambling identifier and an active downlink bandwidth part (BWP) of the terminal device not being a default downlink BWP, starting or restarting a timer used by the terminal device to switch from the active downlink BWP to the default downlink BWP wherein the first scrambling identifier is a cell radio network temporary identifier (C-RNTI) or a configured scheduling radio network temporary identifier (CS-RNTI);

wherein the receiving the first message from the network device, comprises:

receiving the first message on a first carrier or a first serving cell, the first message includes a carrier index, wherein the carrier index indicates a second carrier or a second serving cell;

wherein the starting or restarting the timer comprises:

starting or restarting a timer associated with the second carrier or the second serving cell, wherein the active downlink BWP of the terminal device comprises a downlink BWP of the second carrier or the second serving cell.

15. The non-transitory computer-readable storage medium according to claim 14, wherein the terminal device further executes the following steps:

initiating a random access procedure; and stopping the timer upon initiation of the random access procedure.

* * * * *